US012739650B2

(12) United States Patent
Kim et al.

(10) Patent No.: US 12,739,650 B2
(45) Date of Patent: Sep. 15, 2026

(54) METHOD AND APPARATUS FOR CONTROLLING COLLISION OF SHARING RESOURCES IN DYNAMIC SHARED SPECTRUM

(71) Applicant: Samsung Electronics Co., Ltd., Gyeonggi-do (KR)

(72) Inventors: Youngjoon Kim, Gyeonggi-do (KR); Seungil Park, Gyeonggi-do (KR); Hyojin Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 774 days.

(21) Appl. No.: 18/015,451

(22) PCT Filed: Jul. 7, 2021

(86) PCT No.: PCT/KR2021/008658
§ 371 (c)(1),
(2) Date: Jan. 10, 2023

(87) PCT Pub. No.: WO2022/014947
PCT Pub. Date: Jan. 20, 2022

(65) Prior Publication Data

US 2023/0284032 A1 Sep. 7, 2023

(30) Foreign Application Priority Data

Jul. 16, 2020 (KR) ........................ 10-2020-0088315

(51) Int. Cl.
*H04W 16/14* (2009.01)
*H04W 72/044* (2023.01)

(52) U.S. Cl.
CPC ......... *H04W 16/14* (2013.01); *H04W 72/044* (2013.01)

(58) Field of Classification Search
CPC ............................ H04W 16/14; H04W 72/044
See application file for complete search history.

(56) References Cited

U.S. PATENT DOCUMENTS 8,503,383 B2 8/2013 Hu et al.
8,902,778 B2 12/2014 Bae et al.
9,648,501 B2 5/2017 Priotti
10,182,456 B2 1/2019 Damnjanovic et al.
(Continued)

FOREIGN PATENT DOCUMENTS

CN 103891334 6/2014
CN 105917691 8/2016
(Continued)

OTHER PUBLICATIONS

PCT/ISA/210 Search Report issued on PCT/KR2021/008658, Oct. 8, 2021 pp. 7.
(Continued)

*Primary Examiner* — Sujoy K Kundu
*Assistant Examiner* — Weibin Huang
(74) *Attorney, Agent, or Firm* — The Farrell Law Firm, P.C.

(57) ABSTRACT

Disclosed are a method and a base station, the method allowing a first base station and a second base station to exchange a resource sharing message, scheduling resources on the basis of the resource sharing message, and controlling the collision of sharing resources on the basis of a collision control message.

14 Claims, 21 Drawing Sheets

(56) References Cited

U.S. PATENT DOCUMENTS

| | | | | |
|---|---|---|---|---|
| 10,187,805 | B2 | 1/2019 | Zhou | |
| 10,498,484 | B2 | 12/2019 | Yeo et al. | |
| 10,638,489 | B2 | 4/2020 | Noh et al. | |
| 11,412,465 | B2 | 8/2022 | Choi et al. | |
| 12,317,104 | B2 | 5/2025 | Li | |
| 2012/0201202 | A1 | 8/2012 | Hong et al. | |
| 2012/0258724 | A1* | 10/2012 | Kim | H04L 1/0003 455/452.2 |
| 2016/0088617 | A1 | 3/2016 | Goldhamer | |
| 2016/0150461 | A1* | 5/2016 | Oyama | H04W 24/10 370/328 |
| 2017/0013465 | A1 | 1/2017 | Luo et al. | |
| 2017/0041098 | A1* | 2/2017 | Saghir | H04W 72/27 |
| 2017/0150388 | A1* | 5/2017 | Wen | H04L 5/00 |
| 2018/0184456 | A1* | 6/2018 | Subramani | H04W 74/0816 |
| 2018/0270815 | A1 | 9/2018 | Bala et al. | |
| 2018/0324676 | A1* | 11/2018 | Huang | H04W 76/27 |
| 2020/0383118 | A1* | 12/2020 | Park | H04W 72/046 |

FOREIGN PATENT DOCUMENTS

| | | |
|---|---|---|
| CN | 108809547 | 11/2018 |
| CN | 110945898 | 3/2020 |
| EP | 3 425 837 | 1/2019 |
| KR | 1020110037420 | 4/2011 |
| KR | 10-2014-0070586 | 6/2014 |
| KR | 10-2017-0009303 | 1/2017 |
| KR | 1020170113473 | 10/2017 |
| KR | 10-1815946 | 1/2018 |
| KR | 1020180007584 | 1/2018 |
| KR | 1020180049750 | 5/2018 |
| KR | 1020180049809 | 5/2018 |
| KR | 10-1967813 | 8/2019 |
| KR | 10-2042949 | 11/2019 |
| WO | WO 2014/017441 | 1/2014 |
| WO | WO 2015/055243 | 4/2015 |
| WO | WO 2020/029977 | 2/2020 |

OTHER PUBLICATIONS

PCT/ISA/237 Written Opinion issued on PCT/KR2021/008658, Oct. 8, 2021 pp. 5.

Chinese Office Action dated Apr. 8, 2025 issued in counterpart application No. 202180060732.8, 24 pages.

Institute for Information Industry (III), "Integrated Resource Scheduling for In-Coverage D2D Communication to Support Mode 1 and Mode 2", R1-141499.

3GPP TSG RAN WG1 Meeting #76bis, Mar. 31-Apr. 4, 2014, 6 pages.

Chinese Office Action dated Aug. 21, 2025 issued in counterpart application No. 202180060732.8, 14 pages.

Korean Office Action dated Jul. 7, 2025 issued in counterpart application No. 10-2020-0088315, 10 pages.

KR Decision of Patent dated Nov. 21, 2025 issued in counterpart application No. 10-2020-0088315, 5 pages.

* cited by examiner

FIG. 7B

FIG. 10
(1000) Used resource of mobile network operator B
(1002) Used resource of mobile network operator A
(1004) Used resource of mobile network operator C
(1010) Failure resource
(1012) Unused resource
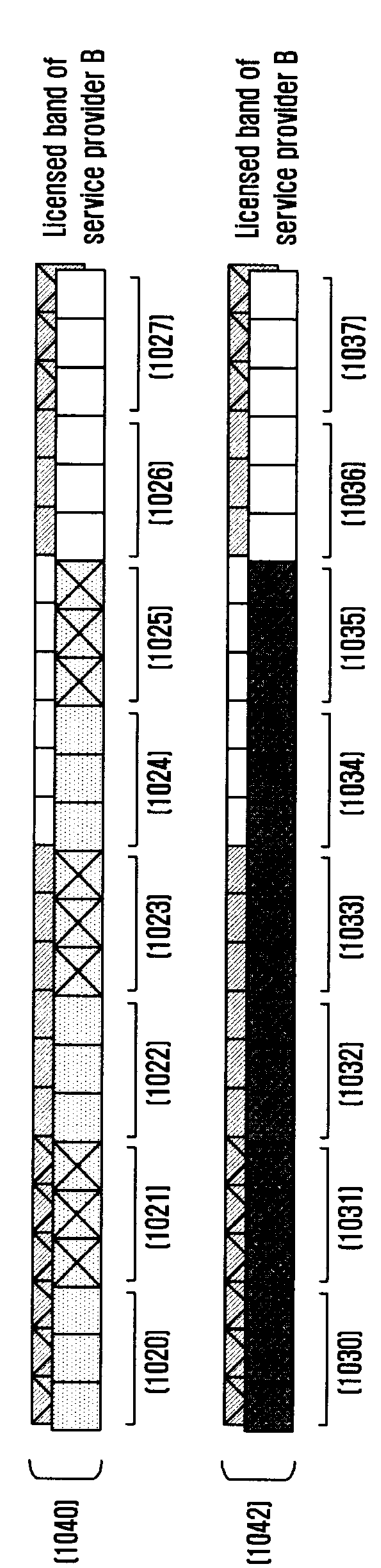

METHOD AND APPARATUS FOR CONTROLLING COLLISION OF SHARING RESOURCES IN DYNAMIC SHARED SPECTRUM

PRIORITY

This application is a National Phase Entry of PCT International Application No. PCT/KR2021/008658 which was filed on Jul. 7, 2021, and claims priority to Korean Patent Application No. 10-2020-0088315, which was filed on Jul. 16, 2020, the entire content of each of which is incorporated herein by reference.

TECHNICAL FIELD

The disclosure relates to a method and an apparatus for controlling collision of resources in a dynamic shared spectrum in a wireless communication system.

BACKGROUND ART

In looking back on the development processes with the repetition of the wireless communication generations, technologies for mainly human-targeted services, such as voice, multimedia, and data, have been developed. Connected devices, which are explosively on the rise after commercialization of the 5$^{th}$ generation (5G) communication system, have been expected to be connected to a communication network. Examples of things connected to the network may be vehicles, robots, drones, home appliances, displays, smart sensors installed in various kinds of infrastructures, construction machines, and factory equipment. Mobile devices are expected to be evolved to various form factors, such as augmented reality glasses, virtual reality headsets, and hologram devices. In the 6th generation (6G), in order to provide various services through connection of hundreds of billions of devices and things with one another, efforts for developing an improved 6G communication system have been made. For this reason, the 6G communication system is called a "beyond 5G system".

In the 6G communication system that is expected to be realized around 2030, the maximum transmission speed is tera (i.e., 1,000 giga) bps, and wireless latency is 100 microseconds (μsec). That is, as compared with the 5G communication system, the transmission speed in the 6G communication system becomes 50 times faster, and the wireless latency is reduced to 1/10.

In order to accomplish such a high data transmission speed and ultra-low latency, implementation of the 6G communication system in terahertz bands (e.g., 95 gigahertz (95 GHz) to 3 terahertz (3 THz) bands) is being considered. In the terahertz bands, due to more severe path loss and atmospheric absorption phenomena than those in the millimeter wave (mmWave) bands introduced in the 5G, the importance of a technology to secure a signal reaching distance, that is, the coverage, is expected to become grower. As a primary technology to secure the coverage, it is required to develop a radio frequency (RF) element, antenna, more superior new waveform than the waveform of the orthogonal frequency division multiplexing (OFDM) in the coverage aspect, beamforming and massive multiple-input multiple-output (massive MIMO), full dimensional MIMO (FD-MIMO), array antenna, and multi-antenna transmission technology, such as large scale antenna technique. In addition, in order to improve the coverage of the terahertz band signals, new techniques, such as metamaterial-based lens and antenna, high-level spatial multiplexing technology using orbital angular momentum (OAM), and reconfigurable intelligent surface (RIS), are being discussed.

In addition, for frequency efficiency enhancement and system network improvement, in the 6G communication system, developments are under way in a full duplex technology in which an uplink and a downlink simultaneously utilize the same frequency resource at the same time, a network technology to integrally utilize a satellite and high-altitude platform station (HAPS), a network structure innovation technology to support a mobile base station and to enable network operation optimization and automation, a dynamic spectrum sharing technology through collision avoidance based on spectrum usage prediction, an AI-based communication technology to realize system optimization by utilizing artificial intelligence (AI) from a design stage and internalizing end-to-end AI support function, and a next-generation distributed computing technology to realize services having complexity that exceeds the limit of the UE operation capability by utilizing ultrahigh performance communication and computing resources (mobile edge computing (MEC) or cloud). In addition, attempts are continuing to further strengthen connectivity between devices through designing of a new protocol to be used in the 6G communication system, implementation of hardware-based security environment, development of a mechanism for safe utilization of data, and technical development of a privacy maintaining method, to further optimize the network, to accelerate software of network entities, and to increase openness of the wireless communication.

By such researches and developments of the 6G communication system, it is expected that the next hyper-connected experience is possible through hyper-connectivity of the 6G communication system including not only connection between things but also connection between a human and a thing in all. Specifically, it is expected that services, such as truly immersive extended reality (XR), high-fidelity mobile hologram, and digital replica, can be provided through the 6G communication system. Further, since services, such as remote surgery, industrial automation, and emergency response through increasing security and credibility, can be provided through the 6G communication system, the 6G communication system will be applied to various fields, such as industry, medical treatment, automobile, and home appliances.

In a general wireless communication system, a specific spectrum resource (hereinafter, interchangeably used with a frequency resource) is exclusively allocated for a specific service. The spectrum allocated to each mobile network operator is unable to be fully used except a spatiotemporal situation in which very much data traffics of all service providers exist, and thus resources may be wasted.

DISCLOSURE

Technical Problem

In order to solve the problems, the disclosure proposes a method and an apparatus for controlling collision that occurs when frequency resources are dynamically shared.

Solution to Problem

According to the disclosure to solve the above problems, a method by a second base station in a communication system may include: receiving, from a first base station, a message including information for determining whether there is a collision occurred on shared resources of the first base station; transmitting, to the first base station, a message including the information for determining whether there is the collision occurred on the shared resources of the first base station; determining, by the second base station, whether the collision has occurred on the shared resources of the first base station; determining, by the first base station, whether the collision has occurred on the shared resources of the first base station; transmitting, to the first base station, a message including information for controlling usage of the shared resources; and controlling, by the first base station, the usage of the shared resources.

Further, a second base station in a communication system may include: a connection unit configured to transmit and receive a signal to and from a network node including a first base station; and a controller configured to: schedule some resources of second frequency resources corresponding to the second base station to a second terminal, transmit and receive data by using the some resources of the second frequency resources, receive, from the first base station, a message including information for determining whether there is a collision occurred on shared resources of the first base station, transmit, to the first base station, a message including the information for determining whether there is the collision occurred on the shared resources, transmit a message including information for limiting usage of shared resources on the second frequency resources of the first base station based on information collected from the first base station and information collected from the second base station in order to control the collision on the shared resources of the first base station, and control the first base station to use the shared resources on the second frequency resource.

Advantageous Effects of Invention

According to the disclosure, it is possible to control the resource collision occurring when the dynamic frequencies are shared between mobile network operators, and through this, the frequency resources can be operated more efficiently.

BRIEF DESCRIPTION OF DRAWINGS

FIG. 7B is a diagram illustrating an example of a method in which a first base station of a first mobile network operator is allocated with a resource for communicating with a first UE by using a second frequency resource of a second mobile network operator.

FIG. 10 is a diagram illustrating an example of a method for determining whether collision has occurred in case of using the resource explained in FIGS. 8 and 9 by utilizing NACK occurrence resource information and scheduling resource allocation information.

MODE FOR INVENTION

Figure 1:
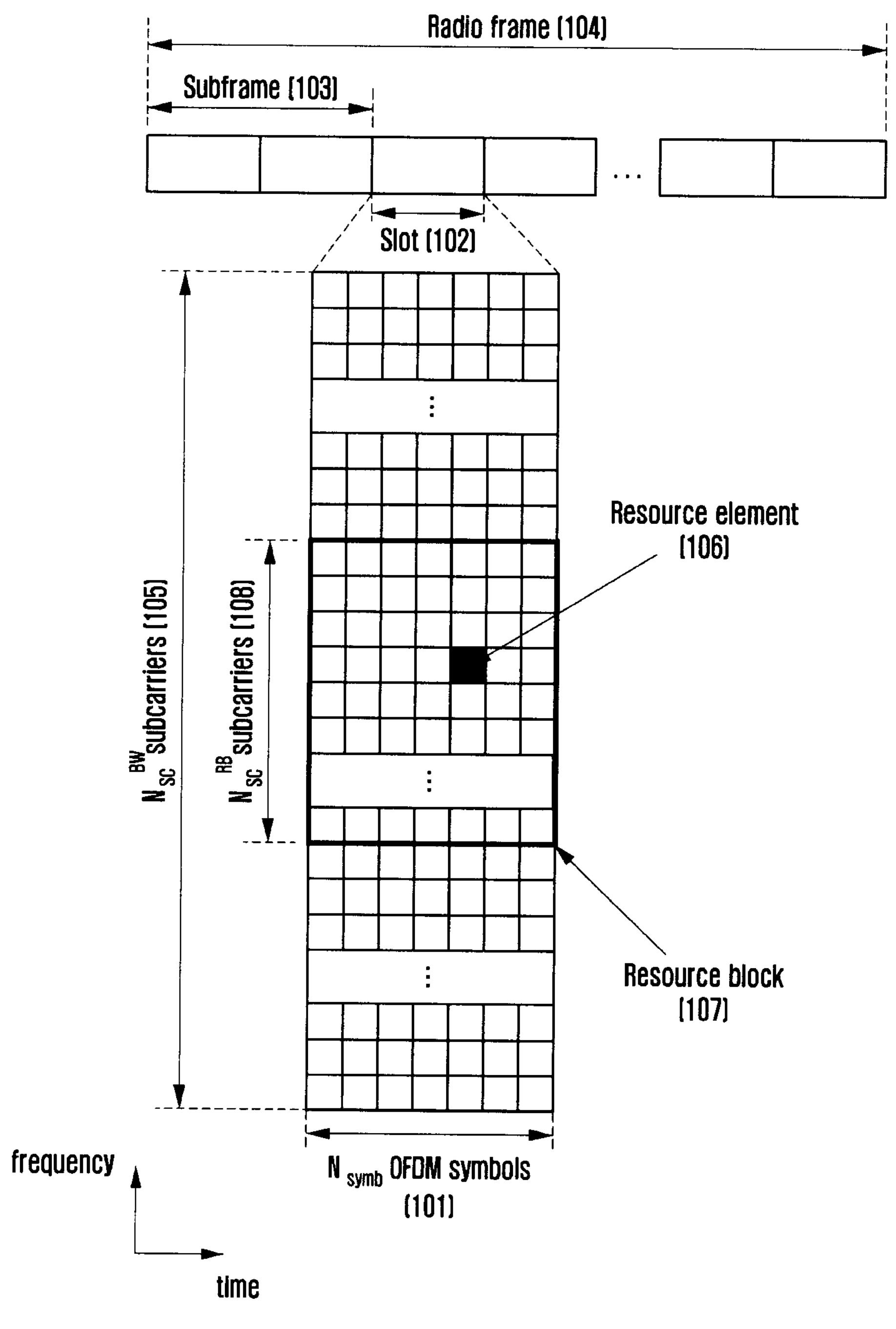
FIG. 1 is a diagram illustrating the basic structure of a time-frequency domain that is a radio resource area of an LTE system.

Hereinafter, embodiments of the disclosure will be described in detail with reference to the accompanying drawings.

In describing the embodiments, explanation of technical contents that are well known in the technical field to which the disclosure pertains and are not directly related to the disclosure may be omitted. This is to transfer the subject matter of the disclosure more clearly without obscuring the same through omission of unnecessary explanations.

For the same reason, in the accompanying drawings, some constituent elements are exaggerated, omitted, or briefly illustrated. Further, sizes of the respective constituent elements do not completely reflect the actual sizes thereof, and in the drawings, the same reference numerals are used for the same or corresponding constituent elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The embodiments are provided to complete the disclosure and to completely notify those of ordinary skill in the art to which the disclosure pertains of the category of the disclosure, and the disclosure is only defined within the scope of the appended claims. In the entire description of the disclosure, the same reference numerals are used for the same elements across various figures.

In this case, it will be understood that each block of the flowchart illustrations, and combinations of blocks in the flowchart illustrations, can be performed by computer program instructions. These computer program instructions can be loaded to a processor of a general purpose computer, special purpose computer, or other programmable data processing apparatus, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable data processing apparatus to produce a computer implemented process such that the instructions which are executed on the computer or other programmable data processing apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as FPGA or ASIC, and performs certain tasks. However, "~unit" is not meant to be limited to software or hardware. The term "~unit" may be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "~units" may be combined into fewer components and "~units" or further separated into additional components and "~units". Further, the components and "~units" may be implemented to operate one or more CPUs in a device or a security multimedia card. Further, in an embodiment, the "~units" may include one or more processors.

In the following description, a term to identify an access node, a term to denote network entities, a term to denote messages, a term to denote an interface between network entities, and a term to denote a variety of types of identity information have been exemplified for convenience in explanation. Accordingly, the disclosure is not limited to the following terms, and other terms to denote targets having equivalent technical meanings may be used.

For convenience in explanation, in the disclosure, terms and names defined in the standards for 5G or NR and LTE systems are used. However, the disclosure is not restricted by the terms and names, but may be equally applied to systems complying with other standards.

That is, in describing embodiments of the disclosure in detail, although the communication standards determined by the 3GPP will be the main target, the primary gist of the disclosure can be applied even to other communication systems having similar technical backgrounds with slight modifications in a range that does not greatly deviate from the scope of the disclosure, and this will be possible by the judgment of a person skilled in the art to which the disclosure pertains.

A wireless communication system was initially developed for the purpose of providing a voice-oriented service, but has been expanded to, for example, a broadband wireless communication system that provides a high-speed and high-quality packet data service like communication standards, such as 3GPP high speed packet access (HSPA), long term evolution (LTE) or evolved universal terrestrial radio access (E-UTRA), LTE-advanced (LTE-A), 3GPP2 high rate packet data (HRPD), ultra mobile broadband (UMB), and IEEE 802.16e.

In an LTE and NR systems that are representative examples of the broadband wireless communication systems, a downlink (DL) adopts an orthogonal frequency division multiplexing (OFDM) scheme (or cyclic prefix based orthogonal frequency division multiplex (CP-OFDM) scheme), and an uplink (UL) adopts a single carrier frequency division multiple access (SC-FDMA) scheme (or discrete Fourier transform spread OFDM (DFT-s-OFDM) scheme) or a CP-OFDM scheme. The uplink means a radio link in which a user equipment (UE) or a mobile station (MS) transmits data or a control signal to a base station (generation Node B (gNB) or eNode B (eNB) or base station (BS) which is a node that can allocate radio resources to a plurality of UEs: the radio access technology supported by the base station is not limited), and the downlink means a radio link in which the base station transmits data or a control signal to the UE. According to the above-described multiple access schemes, in general, data of respective users or control information are discriminated from each other by performing an allocation and an operation so as to prevent time-frequency resources for carrying the data or control information for each user from overlapping each other, that is, to establish orthogonality.

In a 5G communication system that is beyond an LTE communication system, it is necessary to freely reflect various requirements of users and service providers, and services simultaneously satisfying the various requirements should be supported. Services being considered for the 5G communication system may be enhanced mobile broadband (eMBB) communication, massive machine type communication (mMTC), and ultra-reliability low-latency communication (URLLC).

In a general wireless communication system, a specific spectrum resource (hereinafter, interchangeably used with a frequency resource) is exclusively allocated for a specific service. Representatively, in case of cellular communication, the state leases a specific spectrum resource to a specific mobile network operator, and the mobile network operator having been allocated with the resource exclusively maintains a cellular network by utilizing the corresponding resource. However, the spectrum allocated to each mobile network operator is unable to be fully used except a spatiotemporal situation in which very much data traffics exist, and thus resources have been wasted.

In order to solve such a situation, a situation in which a dynamic frequency can be shared between mobile network operators may be considered. Each service provider may be first allocated with a spectrum resource being permitted to be used, and in case of a small usage amount of resource, it may permit another service provider to use the corresponding resource. In the above-described scenario, the service provider is not required to be allocated with unnecessarily many spectrums to cope with the maximum traffic situation. Accordingly, a dynamic frequency sharing system between service providers will be a base technology for a 6G or 5G communication system that can efficiently operate the spectrum resources that gradually become scarce.

Prior to description of the detailed contents, a frame structure of an LTE and LTE-A systems will be described in more detail with reference to the drawings. The following resource structure illustrates a resource structure of the LTE and LTE-A systems, but a similar resource structure may be applied to 5G or other communication systems.

FIG. 1 is a diagram illustrating the basic structure of a time-frequency domain that is a radio resource area of an LTE system. In FIG. 1, a horizontal axis represents a time domain, and a vertical axis represents a frequency domain. The minimum transmission unit in the time domain is an OFDM symbol, and $N_{symb}$ (101) OFDM symbols are gathered to constitute one slot 102, and two slots are gathered to constitute one subframe 103. The length of the slot is 0.5 ms, and the length of the subframe is 1.0 ms. Further, a radio frame 104 is a time domain unit composed of 10 subframes. The minimum transmission unit in the frequency domain is a subcarrier, and the bandwidth of the overall system transmission band is composed of total $N_{BW}$ (105) subcarriers. In the time-frequency domain, the basic resource unit is a resource element (RE) 106, and may be represented as an OFDM symbol index and a subcarrier index. A resource block (RB) (or physical resource block (PRB)) 107 is defined as $N_{symb}$ (101) successive OFDM symbols in the time domain and $N_{RB}$ (108) successive subcarriers in the frequency domain. Accordingly, one RB (108) is composed of $N_{symb} \times N_{RB}$ REs (106). In general, the minimum transmission unit of data is the unit of RB, and in the LTE system, it is general that $N_{symb}=7$ and $N_{RB}=12$, and $N_{BW}$ is in proportion to the bandwidth of the system transmission band.

Next, downlink control information (DCI) in the LTE and LTE-A systems will be described in detail.

In the LTE system, scheduling information on downlink data or uplink data is transferred from a base station to a UE through DCI. The DCI is defined in several formats, and the determined DCI formation is applied depending on whether the scheduling information is for the uplink data or the downlink data, whether the DCI is compact DCI having a small size of control information, whether to apply spatial multiplexing using multiple antennas, and whether the DCI is for power control. For example, DCI format 1 that is scheduling control information on the downlink data is configured to include at least the following control information.

- Resource allocation type 0/1 flag: This notifies whether a resource allocation type is type 0 or type 1. The type 0 allocates a resource in a resource block group (RBG) unit by applying a bitmap method. In the LTE system, the basic scheduling unit is an RB that is expressed as time and resource area resources, and an RBG is composed of a plurality of RBs, and becomes the basic scheduling unit in type 0. The type 1 allocates a specific RB within the RBG.
- Resource block assignment: This notifies of an RB allocated to data transmission. The resource being expressed is determined in accordance with the system bandwidth and the resource allocation type.
- Modulation and coding scheme (MCS): This notifies of a modulation type used for data transmission and the size of a transport block that is data to be transmitted.
  - HARQ process number: This notifies of a process number of a hybrid automatic repeat request (HARQ).
- New data indicator: This notifies of whether the transmission is an HARQ initial transmission or retransmission.
- Redundancy version: This notifies of an HARQ redundancy version.

Transmit power control (TPC) command for physical uplink control channel (PUCCH): This notifies of a transmit power control command for PUCCH that is an uplink control channel.

The DCI passes through the channel coding and modulation process, and is transmitted on a physical downlink control channel (PDCCH) that is a downlink physical control channel. A cyclic redundancy check (CRC) is joined to a DCI message payload, and the CRC is scrambled with a UE identifier (e.g., cell-radio network temporary identifier (C-RNTI)) corresponding to the identity of a UE. Different RNTIs are used depending on the purpose of a DCI message, for example, UE-specific data transmission, power control command, or random access response (RAR). That is, the RNTI is not explicitly transmitted, but is included in a CRC calculation process and is transmitted. If the DCI message being transmitted on the PDCCH is received, the UE identifies the CRC by using the allocated RNTI, and if the CRC identification result is correct, the UE can know that the corresponding message has been transmitted to the UE.

Figure 2:
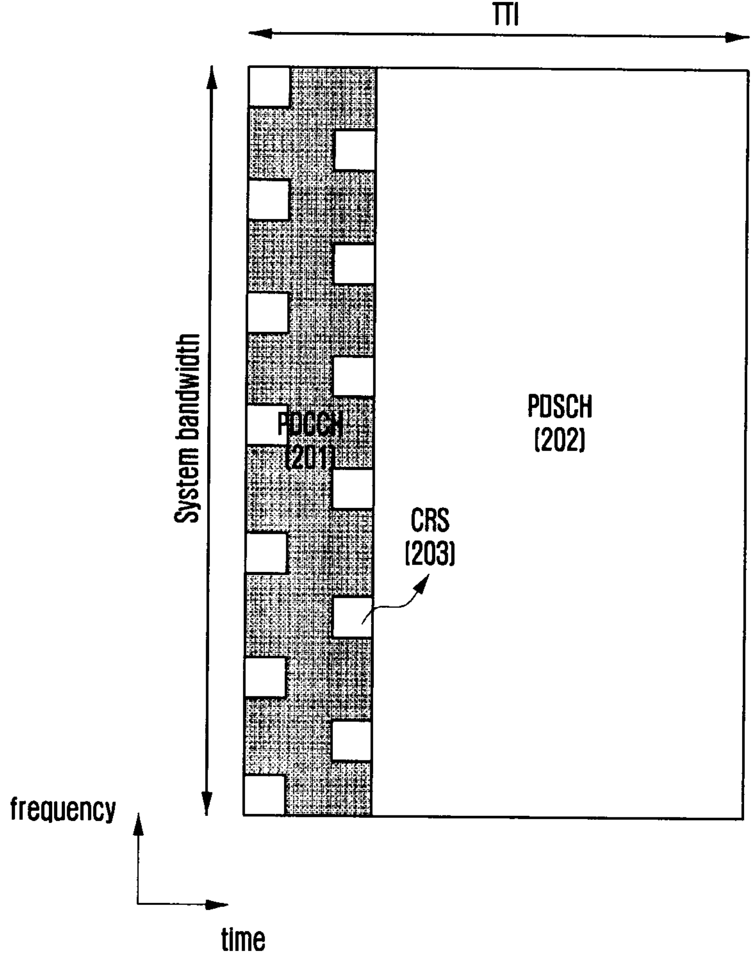
FIG. 2 is a diagram illustrating PDCCH 201 that is a downlink physical channel on which DCI of an LTE system is transmitted.

FIG. 2 is a diagram illustrating PDCCH 201 that is a downlink physical channel on which DCI of an LTE system is transmitted. According to FIG. 2, the PDCCH 201 is time-multiplexed with a physical downlink shared channel (PDSCH) 202 that is a data transmission channel, and is transmitted over the overall system bandwidth. The area of the PDCCH 201 is expressed by the number of OFDM symbols, and this is indicated to a UE as a control format indicator (CFI) that is transmitted through a physical control format indicator channel (PCFICH). By allocating the PDCCH 201 to an OFDM symbol that comes to a front part of a subframe, the UE can decode the DCI that allocates downlink scheduling as soon as possible, and through this, it is possible to reduce the decoding delay for the PDSCH (or downlink shared channel (DL-SCH)), that is, the overall downlink transmission delay. Since one PDCCH can carry one DCI message, and a plurality of UEs can be simultaneously scheduled through the downlink and the uplink, transmission of a plurality of PDCCHs is simultaneously performed in each cell.

As a reference signal (RS) for decoding the PDCCH 201, a cell-specific RS (CRS) 203 is used. The CRS 203 is transmitted every subframe across the whole band, and scrambling and resource mapping differ in accordance with a cell identity (ID) (e.g., physical cell ID (PCI)). Since the CRS 203 is a reference signal commonly used by all UEs, the UE-specific beamforming is unable to be used. Accordingly, the multi-antenna transmission techniques for the PDCCH of the LTE system is limited to open-loop transmit diversity. The number of CRS ports is implicitly known to the UE through decoding of a physical broadcast channel (PBCH).

The resource allocation of the PDCCH 201 is based on a control-channel element (CCE), and one CCE is composed of 9 resource element groups (REGs), that is, total 36 REs (one REG is composed of 4 REs). The number of CCEs required for the specific PDCCH 201 may be 1, 2, 4, or 8, and may differ depending on the channel coding rate of a DCI message payload. The different numbers of CCEs as described above are used to implement link adaptation of the PDCCH 201. The UE should detect a signal in a state where it does not know the information on the PDCCH 201, and thus, in the LTE system, a search space that represents a set of CCEs for blind decoding has been defined. The search space is composed of a plurality of sets at each CCE aggregation level (AL), and the search space is not explicitly signaled, but may be implicitly defined through a function by a UE identity and the subframe number. In each subframe, the UE performs decoding of the PDCCH 201 with respect to all possible resource candidate groups that can be made from the CCEs in the configured search space, and processes information declared as valid to the corresponding UE through the CRC identification.

The search space is classified into a UE-specific search space and a common search space. Since the UE-specific search space is not explicitly signaled, but is implicitly defined through the UE identity function and the subframe number, the UE-specific search space may be changed in accordance with the subframe number, and this means that the search space may be changed in accordance with the time. Through this, it may be possible to solve a problem (defined as a blocking problem) in that a specific UE of the UEs is unable to use the search space by other UEs. In case that a certain UE is unable to be scheduled in the corresponding subframe because all CCEs being checked by the UE itself have already been used by other scheduled UEs in the same subframe, such a problem may not occur in the next subframe since the search space is changed in accordance with the time. For example, since the UE-specific search space is changed for each subframe even if parts of the UE-specific search space of UE #1 and UE #2 overlap each other in the specific subframe, it can be expected that overlapping in the next subframe may differ from the overlapping in the current subframe.

In case of the common search space, since UEs in a certain group or all UEs should receive the PDCCH, the common search space is defined as a set of pre-engaged CCEs. That is, the common search space is not changed in accordance with the UE identity or the subframe number. The UEs in the certain group or all UEs may check the common search space of the PDCCH 201 in order to receive cell-common control information, such as dynamic scheduling for the system information or paging message. For example, the UE can receive the DL-SCH scheduling allocation information for transmission of system information block (SIB)-1 including service provider information of the cell by checking the common search space of the PDCCH 201. Further, although the common search space exists for transmission of various system messages, it may be used to transmit control information of an individual UE. Through this, the common search space may be used as a solution for the phenomenon where the UE is unable to be scheduled due to a lack of available resources in the UE-specific search space.

The search space for the LTE PDCCH is defined as in Table 1 below.

TABLE 1

| |
|---|
| The set of PDCCH candidates to monitor are defined in terms of search spaces, where a $S_k^{(L)}$ at aggregation level $L \in \{1, 2, 4, 8\}$ is defined by a set of PDCCH canidates. For each serving cell on which PDCCH is monitored, the CCEs corresponding to PDCCH candidate m of the search space $S_k^{(L)}$ are given by |
| $L\{(Y_k + m')\bmod\lfloor N_{CCE,k}/L\rfloor\} + i$ |
| where $Y_k$ is defined below, i = 0, . . . , L − 1. For the common search space m' = m. For the PDCCH UE specific search space, for the serving cell on which PDCCH is monitored, if the monitoring UE is configured with carrier indicator field then |
| $m' = m + M^{(L)} \cdot n_{CI}$ where $n_{CI}$ is the carrier indicator field value, else if the monitoring UE is not configured with carrier indicator field then |

TABLE 1-continued m' = m, where m = 0, . . . , $M^{(L)} - 1$. $M^{(L)}$ is the number of PDCCH candidates to monitor in the given search space.
Note that the carrier indicator field value is the same as ServCellIndex
For the common search spaces, $Y_k$ is set to 0 for the two aggregation levels L = 4 and L = 8.

For the UE-specific search space $S_k^{(L)}$ at aggregation level L, the variable $Y_k$ is defined by
$Y_k = (A \cdot Y_{k-1}) \mathrm{mod} D$
where $Y-1 = n_{RNTI} \neq 0$, A = 39827, D = 65537 and $k = \lfloor n_s/2 \rfloor$, $n_s$ is the slot number within a radio frame.
The RNTI value used for $n_{RNTI}$ is defined in subclause 7.1 in downlink and subclause 8 in uplink.

In the LTE system, the UE has a plurality of search spaces in accordance with each AL. In the LTE system, the number of PDCCH candidates that should be monitored by the UE in the search space defined in accordance with the AL is defined as in the following table.

TABLE 2

| Search space $S_k^{(L)}$ | | | Number of PDCCH |
|---|---|---|---|
| Type | Aggregation level L | Size (in CCEs) | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

According to Table 1 above, in case of the UE-specific search space, the UE supports AL {1, 2, 4, 8}, and in this case, the UE has {6, 6, 2, 2}-numbered PDCCH candidates. In case of the common search space 302, the UE supports AL {4, 8}, and in this case, the UE has {4, 2}-numbered PDCCH candidates. The reason why the AL supports only {r, 8} in the common search space is to improve coverage characteristics since a system message should generally reach the cell edge. The DCI that is transmitted to the common search space is defined only with respect to a specific DCI format, such as 0, 1A, 3, 3A, or 1C, corresponding to the purpose of power control for the system message or the UE group. In the common search space, the DCI format having spatial multiplexing is not supported. The downlink DCI format that should be decoded in the UE-specific search space differs depending on a transmission mode configured for the corresponding UE. Since the configuration of the transmission mode is performed through RRC signaling, an accurate subframe number corresponding to when the corresponding configuration takes effect on the corresponding UE has not been designated. Accordingly, the UE can maintain the connected state and operate by always performing decoding with respect to the DCI format 1A regardless of the transmission mode. As described above, the method for transmitting and receiving the downlink control channel and the downlink control information and the search space in the conventional LTE and LTE-A have been described. Hereinafter, the downlink control channel in the 5G communication system being currently discussed will be described in more detail with reference to the drawings.

Figure 3:
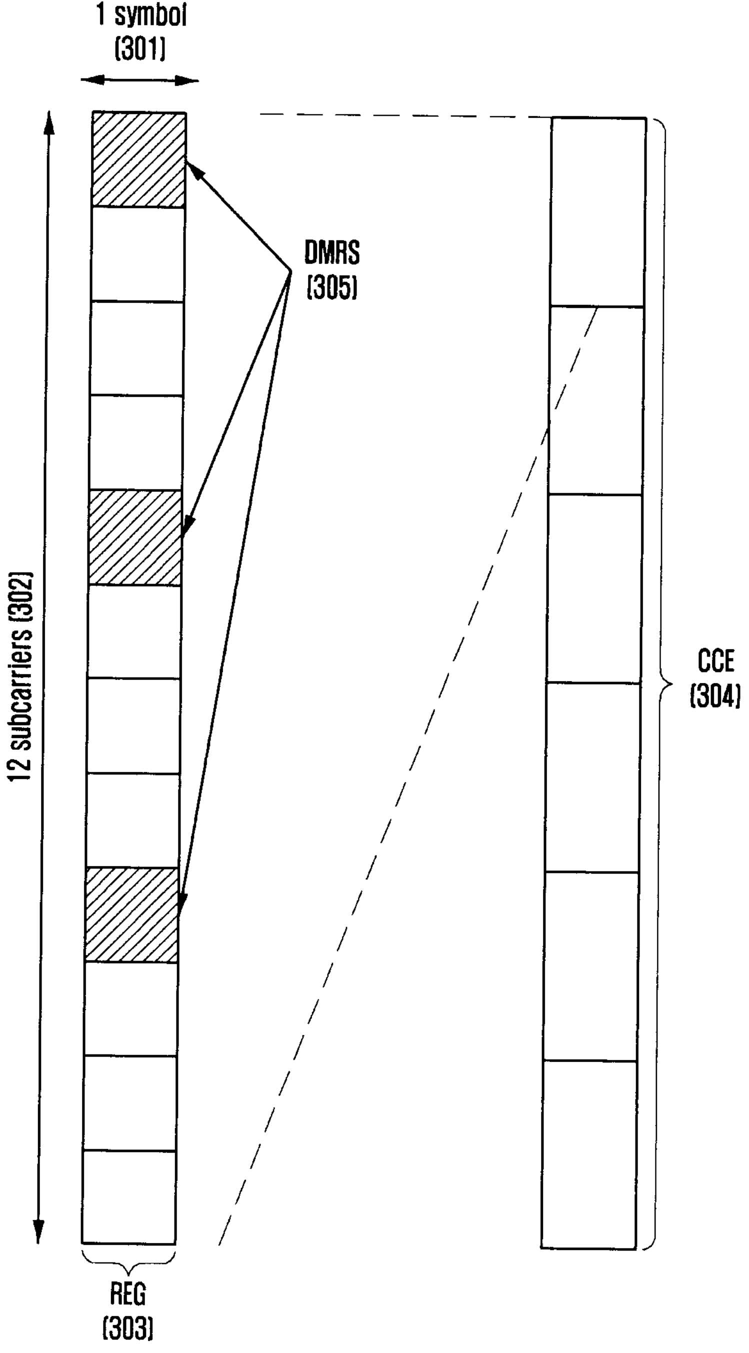
FIG. 3 is a diagram illustrating an example of a basic unit of time and frequency resources constituting a downlink control channel that can be used in a 5G system.

FIG. 3 is a diagram illustrating an example of a basic unit of time and frequency resources constituting a downlink control channel that can be used in a 5G system. According to FIG. 3, the basic unit REG of time and frequency resources constituting a control channel is composed of 1 OFDM symbol 301 on the time axis, and 12 subcarriers 302, that is, 1 RB, on the frequency axis. By assuming that the time-axis basic unit is 1 OFDM symbol 301 in constituting the basic unit of the control channel, a data channel and a control channel may be time-multiplexed in one subframe. By locating the control channel in front of the data channel, user's processing time can be reduced, and thus it is easy to satisfy latency requirements. By configuring the frequency-axis basic unit of the control channel to 1 RB 302, the frequency multiplexing between the control channel and the data channel may be performed more efficiently.

The control resource set (CORESET) of various sizes may be configured by concatenating REG 303 illustrated in FIG. 3. As an example, if it is assumed that the basic unit to which the downlink control channel is allocated in the 5G system is CCE 304, 1 CCE 304 may be composed of a plurality of REGs 303. In case of exemplifying the REG 304 illustrated in FIG. 3, if the REG 303 may be composed of 12 REs, and 1 CCE 304 is composed of 6 REGs 303, it means that 1 CCE 304 may be composed of 72 REs. If the control resource set is configured, the corresponding set may be composed of a plurality of CCEs 304, and a specific downlink control channel may be mapped onto one or a plurality of CCEs 304 to be transmitted in accordance with the AL in the control resource set. The CCEs 304 in the control resource set may be discriminated by their numbers, and in this case, the number may be given in accordance with a logical mapping method.

The basic unit of the downlink control channel illustrated in FIG. 3, that is, the REG 303, may include all of REs onto which the DCI is mapped and an area onto which a demodulation reference signal (DMRS) 305 that is a reference signal for decoding the REs is mapped. As illustrated in FIG. 3, the DMRS 305 may be transmitted in three REs in one REG 303. For reference, since the DMRS 303 is transmitted by using precoding, such as a mapped control signal in the REG 303, the UE can decode the control information even without information on which precoding the base station applies.

Figure 4:
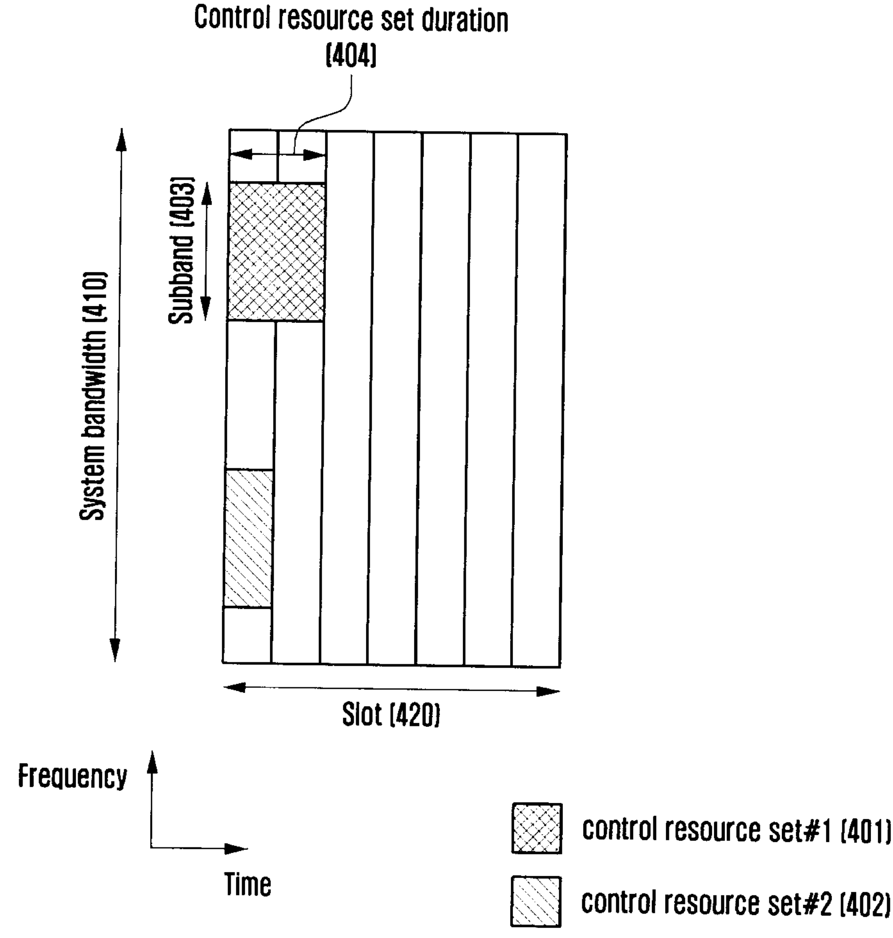
FIG. 4 is a diagram illustrating an example of control resource sets in which a downlink control channel is transmitted in a 5G system.

FIG. 4 is a diagram illustrating an example of control resource sets in which a downlink control channel is transmitted in a 5G system. FIG. 4 illustrates an example in which a system bandwidth 410 is configured in the frequency axis, and two control resource sets (control resource set #1 401 and control resource set #2 402) are configured in one slot 420 (although it is assumed that one slot corresponds to 7 OFDM symbols in an example of FIG. 4, it may correspond to 14 symbols) on the time axis. The control resource sets 401 and 402 may be configured as a specific subband 403 in the overall system bandwidth 410 on the frequency axis. On the time axis, one or a plurality of OFDM symbols may be configured, and this may be defined as a control resource set duration 404. In an example of FIG. 4, the control resource set #1 401 is configured as the control resource set duration of two symbols, and the control resource set #2 402 is configured as the control resource set duration of one symbol.

The control resource set in the 5G system as described above may be configured by the base station to the UE through upper layer signaling (e.g., system information, master information block (MIB), and radio resource control (RRC) signaling). Configuring of the control resource set to the UE means providing of information, such as location of the control resource set, subband, resource allocation of the control resource set, and control resource set duration. For example, the following information may be included.

TABLE 3

| |
|---|
| - Configuration information 1. Frequency-axis RB allocation information<br>- Configuration information 2. Control resource set start symbol<br>- Configuration information 3. Control resource set symbol length<br>- Configuration information 4. REG bundling size (2 or 3 or 6)<br>- Configuration information 5. Transmission mode (interleaved transmission method or non-interleaved transmission method)<br>- Configuration information 6. DMRS configuration information (this may be precoder granularity-related information)<br>- Configuration information 7. Search space type (common search space, group-common search space, and UE-specific search space)<br>- Configuration information 8. DCI format to be monitored in the corresponding control resource set<br>- Others |

In addition to the above configuration information, various pieces of information needed to transmit the downlink control channel may be configured to the UE. Next, the DCI in the 5G system will be described in detail. In the 5G system, scheduling information on uplink data being transmitted on the physical uplink shared channel (PUSCH) and downlink data being transmitted on the PDSCH is transferred from the base station to the UE through the DCI. The UE may monitor a fallback DCI format and a non-fallback DCI format with respect to the PUSCH or PDSCH. The fallback DCI format may be configured as a fixed field between the base station and the UE, and the non-fallback DCI formation may include a configurable field.

The fallback DCI that schedules the PUSCH may include, for example, the following information.

TABLE 4

| |
|---|
| Identifier for DCI formats - [1] bit<br>Frequency domain resource assignment -<br>$[\lceil \log_2(N_{RB}^{UL,BWP}(N_{RB}^{UL,BWP}+1)/2)\rceil]$ bits<br>Time domain resource assignment - 4 bits<br>Frequency hopping flag - 1 bit.<br>Modulation and coding scheme - 5 bits<br>New data indicator - 1 bit<br>Redundancy version - 2 bits<br>HARQ process number - 4 bits<br>TPC command for scheduled PUSCH 명령 - [2] bits<br>UL/SUL indicator - 0 or 1 bit |

The non-fallback DCI that schedules the PUSCH may include, for example, the following information.

TABLE 5

| |
|---|
| SRS resource indicator – $\left\lceil \log_2\left(\sum_{k=1}^{L_{max}}\binom{N_{SRS}}{k}\right)\right\rceil$ or $\lceil \log_2(N_{SRS})\rceil$ bits<br>$\left\lceil \log_2\left(\sum_{k=1}^{L_{max}}\binom{N_{SRS}}{k}\right)\right\rceil$ bits for non−codebook based PUSCH transmission;<br>$\lceil \log 2(N_{SRS})\rceil$ bits for codebook based PUSCH transmission.<br>Precoding information and number of layers - up to 6 bits<br>Antenna ports - up to 5 bits<br>SRS request - 2 bits<br>CSI request - 0, 1, 2, 3, 4, 5, or 6 bits<br>CBG transmission information - 0, 2, 4, 6, or 8 bits<br>PTRS-DMRS association - 0 or 2 bits.<br>beta_offset indicator - 0 or 2 bits<br>DMRS sequence initialization - 0 or 1 bit<br>SRS resource indicator – $\left\lceil \log_2\left(\sum_{k=1}^{L_{max}}\binom{N_{SRS}}{k}\right)\right\rceil$ or $\lceil \log_2(N_{SRS})\rceil$ bits |

TABLE 5-continued

| |
|---|
| $\left\lceil \log_2\left(\sum_{k=1}^{L_{max}}\binom{N_{SRS}}{k}\right)\right\rceil$ bits for non−codebook based PUSCH transmission;<br>$\lceil \log 2(N_{SRS})\rceil$ bits for codebook based PUSCH transmission.<br>Precoding information and number of layers - up to 6 bits<br>Antenna ports - up to 5 bits<br>SRS request - 2 bits<br>CSI request - 0, 1, 2, 3, 4, 5, or 6 bits<br>CBG transmission information - 0, 2, 4, 6, or 8 bits<br>PTRS-DMRS association - 0 or 2 bits.<br>beta_offset indicator - 0 or 2 bits<br>DMRS sequence initialization - 0 or 1 bit |

The fallback DCI that schedules the PDSCH may include, for example, the following information.

TABLE 6

| |
|---|
| Identifier for DCI formats - [1] bit<br>Frequency domain resource asignment -<br>$[\lceil \log_2(N_{RB}^{DL,BWP}(N_{RB}^{DL,BWP}+1)/2)\rceil]$ bits<br>Time domain resource assignment - 4 bits<br>VRB-to-PRB mapping - 1 bit<br>Modulation and coding scheme - 5 bits<br>New data indicator - 1 bit<br>Redundancy version - 2 bits<br>HARQ process number - 4 bits<br>Downlink assignment index - 2 bits<br>TPC command for scheduled PUCCH - [2] bits<br>PUCCH resource indicator 자원 지시자- - 3 bits<br>PDSCH-to-HARQ feedback timing indicator - [3] bits |

The non-fallback DCI that schedules the PUSCH may include, for example, the following information.

TABLE 7

| |
|---|
| Carrier indicator - 0 or 3 bits<br>Identifier for DCI formats - [1] bits<br>Bandwidth part indicator - 0, 1 or 2 bits<br>Frequency domain resource assignment<br>For resource allocation type 0, $\lceil N_{RB}^{DL,BWP}/P\rceil$ bits<br>For resource allocation type 1,<br>$\lceil \log_2(N_{RB}^{DL,BWP}(N_{RB}^{DL,BWP}+1)/2)\rceil$ bits<br>Time domain resource assignment - 1, 2, 3, or 4 bits<br>VRB-to-PRB mapping - 0 or 1 bit, only for resource allocation type 1. |

TABLE 7-continued

|  |
|---|
| 0 bit if only resource allocation type 0 is configured; |
| 1 bit otherwise. |
| PRB bundling size indicator - 0 or 1 bit |
| Rate matching indicator - 0, 1, or 2 bits |
| ZP CSI-RS trigger - 0, 1, or 2 bits |
| For transport block 1: |
| Modulation and coding scheme - 5 bits |
| New data indicator - 1 bit |
| Redundancy version - 2 bits |
| For transport block 2: |
| Modulation and coding scheme - 5 bits |
| New data indicator - 1 bit |
| Redundancy version - 2 bits |
| HARQ process number - 4 bits |
| Downlink assignment index - 0 or 2 or 4 bits |
| TPC command for scheduled PUCCH - 2 bits |
| PUCCH resource indicator - 3 bits |
| PDSCH-to-HARQ_feedback timing indicator - 3 bits |
| Antenna ports - 4, 5 or 6 bits |
| Transmission configuration indication - 0 or 3 bits |
| SRS request - 2 bits |
| CBG transmission information - 0, 2, 4, 6, or 8 bits |
| CBG flushing out information - 0 or 1 bit |
| DMRS sequence initialization - 1 bit |

Figure 5:
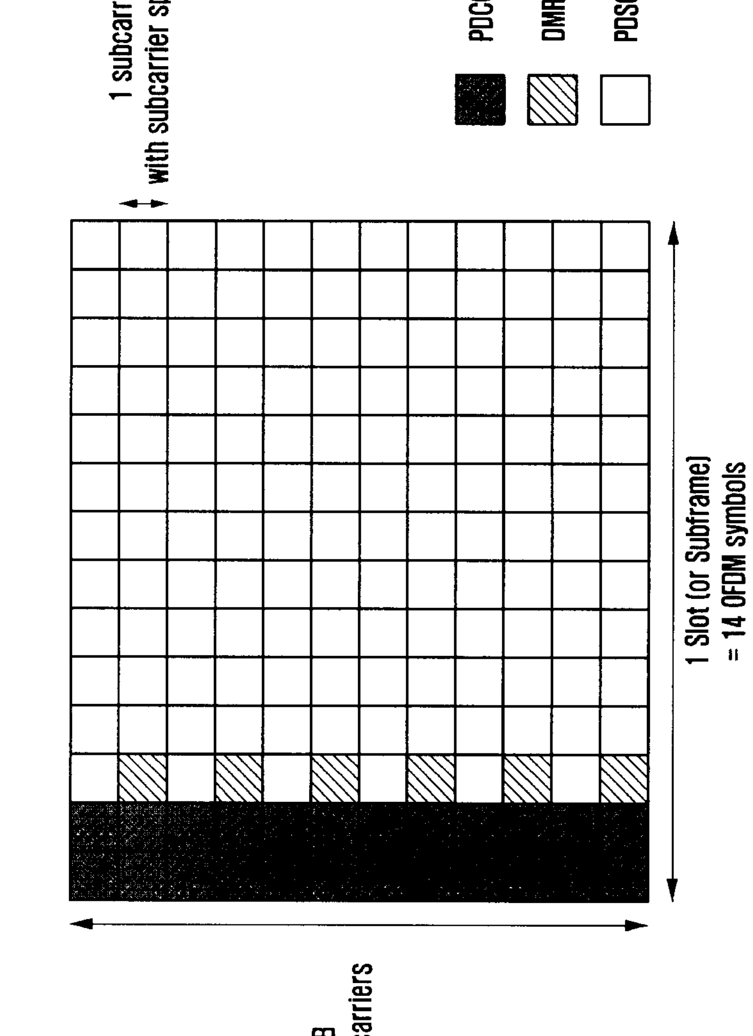
FIG. 5 is a diagram illustrating an example of data transmission using DMRS.

The DCI may be transmitted on the PDCCH through a channel coding and modulation process. The CRC is concatenated to the DCI message payload, and the CRC is scrambled with an RNTI corresponding to the identity of the UE. Different RNTIs are used depending on the purpose of the DCI message, for example, UE-specific data transmission, power control command, or random access response. That is, it means that the RNTI is not explicitly transmitted, but is included in a CRC calculation process and is transmitted. If the DCI message being transmitted on the PDCCH is received, the UE identifies the CRC by using the allocated RNTI, and if the CRC identification result is correct, the UE can know that the corresponding message has been transmitted to the UE. For example, the DCI that schedules the PDSCH for the system information (SI) may be scrambled with system information—RNTI (RA-RNTI). The DCI that schedules the PDSCH for a paging message may be scrambled with paging-RNTI (P-RNTI). The DCI that notifies of a slot format indicator (SFI) may be scrambled with slot format indicator-RNTI (SFI-RNTI). The DCI that notifies of the transmit power control (TPC) may be scrambled with transmit power control—RNTI (TPC-RNTI). The DCI that schedules the UE-specific PDSCH or PUSCH may be scrambled with cell-RNTI (C-RNTI). If a specific UE is scheduled with a data channel, that is, PUSCH or PDSCH, through the PDCCH, data in the corresponding scheduled resource set is transmitted or received together with the DMRS. FIG. 5 is a diagram illustrating an example of data transmission using DMRS. FIG. 5 illustrates an example in which a specific UE is configured to use 14 OFDM symbols as one slot (or subframe) in the downlink, transmit the PDCCH from two initial OFDM symbols, and transmit the DMRS from the third symbol. In case of FIG. 5, in the specific RB scheduled with the PDSCH, the downlink data is mapped onto REs that do not transmit the DMRS from the third symbol and REs from the fourth symbol to the last symbol to be transmitted. As a subcarrier spacing $\Delta f$ expressed in FIG. 5, 15 kHz is used in case of the LTE and LTE-A system, and one of {15, 30, 60, 120, 240, 480} kHz is used in case of the 5G system.

Figure 6:
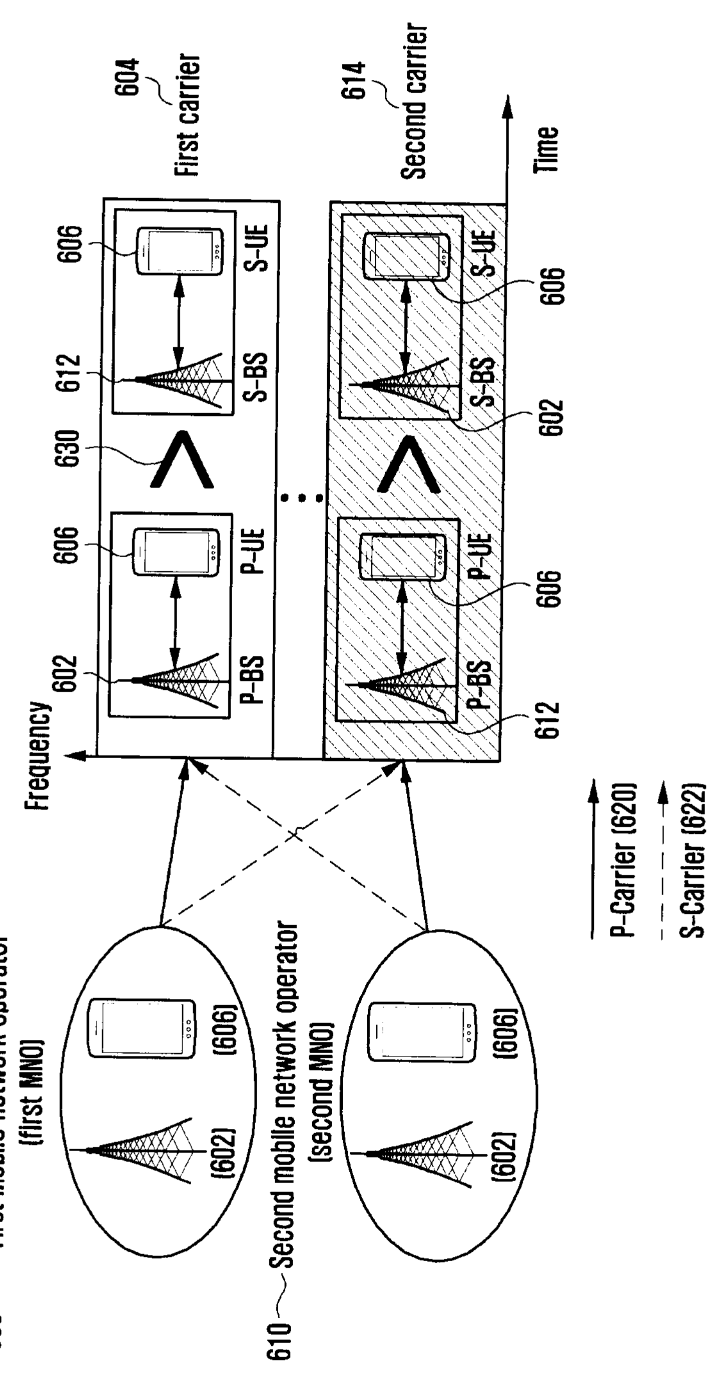
FIG. 6 is a diagram illustrating an example of a method in which a first base station of a first mobile network operator communicates with a UE by using a frequency resource of a second mobile network operator.

FIG. 6 is a diagram illustrating an example of a method in which a first base station of a first mobile network operator communicates with a UE by using a frequency resource of a second mobile network operator.

According to FIG. 6, a first mobile network operator (MNO) 600 may manage a first base station 602, and may provide a service through a first frequency resource 604. Further, the first base station 602 may perform communication with a UE by using some or all of the first frequency resource 604.

Further, a first UE 606 may be a UE that has subscribed to a communication service that is provided by the first mobile network operator 600, and a second UE 616 may be a UE that has subscribed to a communication service that is provided by the second mobile network operator 600. The first UE 606 may receive the communication service provided from the first mobile network operator 600 through the first base station 602, and the second UE 616 may receive the communication service provided from the second mobile network operator 610 through a second base station 612.

The first mobile network operator 600 may provide the communication service to the UE through the frequency resource 604 that is owned or managed by the first mobile network operator. However, according to an embodiment of the disclosure, the first mobile network operator 600 may communicate with the first UE 606 through a second frequency resource 614 that is not owned or managed by the first mobile network operator. For example, the first mobile network operator 600 may communicate with the first UE 606 by using the second frequency resource 614 that is owned or managed by the second mobile network operator.

In case that the first base station 602 performs communication through the first frequency resource 604, the first base station 602 may be called a primary base station (P-BS) with respect to the first frequency resource 604. The first frequency resource 604 may be called a primary carrier (P-Carrier) 620 with respect to the first base station 602. Further, in case that the first base station 602 performs communication by using the second frequency resource 614, the first base station 602 may be called a secondary base station (S-BS) with respect to the second frequency resource 614. The second frequency resource 614 may be called a secondary carrier (S-Carrier) 622 with respect to the first base station 602. In the same manner, in case of performing communication through the P-BS and the P-Carrier, the UE may be called primary user equipment (P-UE), and in case of performing communication through the S-BS and the S-Carrier, the UE may be called secondary user equipment (S-UE).

In case that a plurality of base stations perform communication by using the same frequency resource, the priority for the communication between the P-BS and the P-UE may be higher than the priority for the communication between the S-BS and the S-UE (630). For example, in case that the first base station 602 and the second base station 612 communicate with the UEs being serviced by them, the priority for the communication between the second base station 612 that is the P-BS with respect to the second frequency resource 614 and the second UE 616 that is the P-UE may be higher than the priority for the communication between the first base station 602 that is the S-BS with respect to the second frequency resource 614 and the first UE 606. For example, the time and frequency resource may be preferentially allocated to the communication having the high priority.

Hereinafter, the first base station may be a base station of the first mobile network operator, and the first UE may be a UE of the first mobile network operator. Similarly, the second base station may be a base station of the second mobile network operator, and the second UE may be a UE of the second mobile network operator. Further, although the first mobile network operator and the second mobile network operator can provide the service to the user by using the same wireless communication technology, a case where they provide the service to the user by using another wireless communication technology is also not excluded.

Figure 7A:
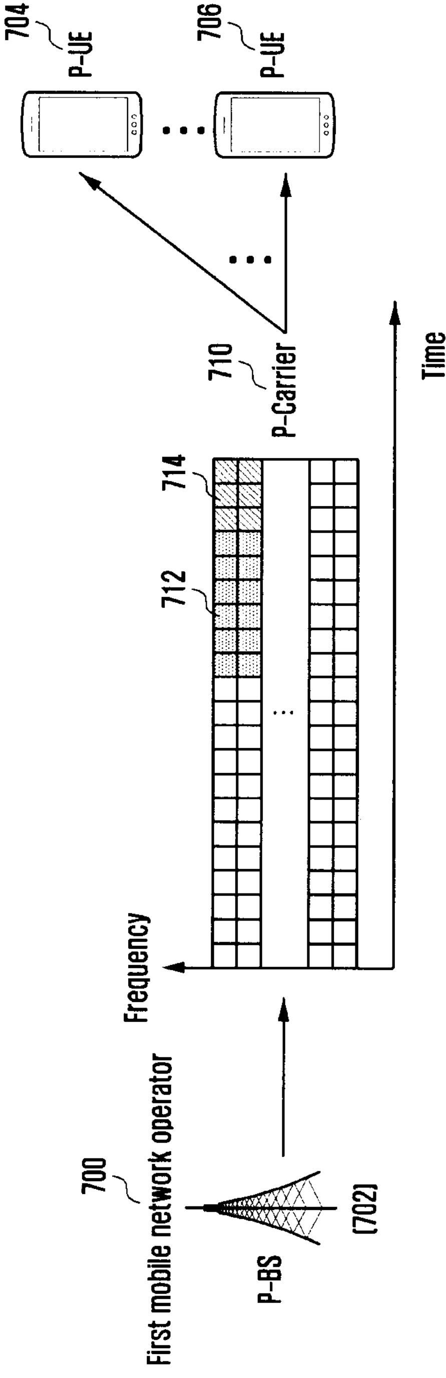
FIG. 7A is a diagram illustrating an example of a resource allocation method in a general cellular network in which a first base station of a first mobile network operator communicates with first UEs by using only a first frequency resource.

FIG. 7A is a diagram illustrating an example of a resource allocation method in a general cellular network in which a first base station of a first mobile network operator communicates with first UEs by using only a first frequency resource.

That the base station uses frequency and/or time resources means that the base station allocates resources of a certain frequency band and/or a certain time interval to the UE through the scheduling, and transmits and receives a signal (e.g., data) to and from the UE by using the allocated resources.

According to FIG. 7A, the first mobile network operator 700 performs communication with the first UEs 704 and 706 by using some or all of the first frequency resource 710. For example, the first base station 702 allocates some 712 of the first frequency resource 710 to the communication with the one first UE 704, and allocates some 714 of the first frequency resource that is not allocated to the other first UE 706. The wireless communication technology of the first mobile network operator is not limited, and in the present example, although two UEs are illustrated, much more UEs may be allocated with the resources.

Figure 7B:
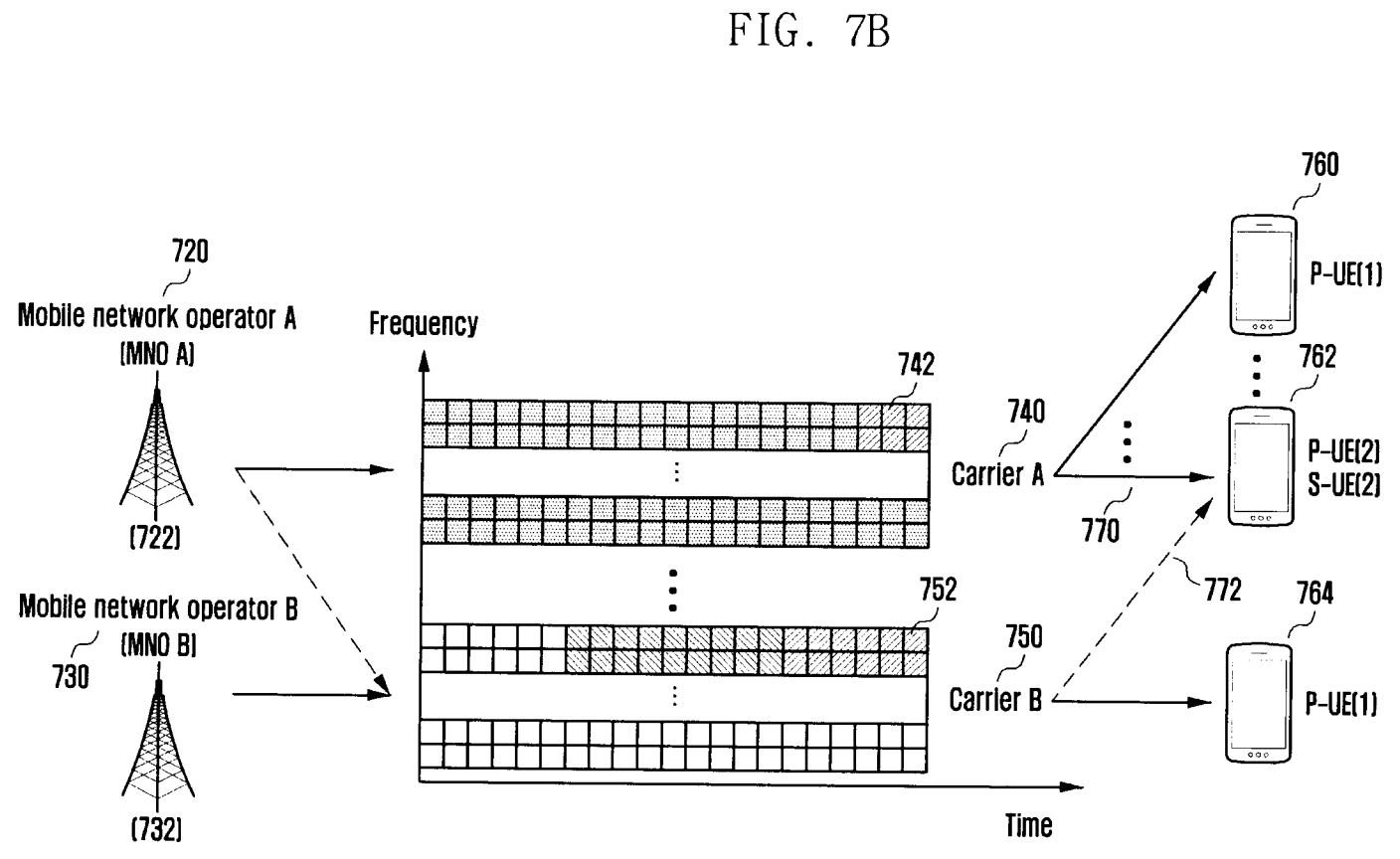

FIG. 7B is a diagram illustrating an example of a method in which a first base station of a first mobile network operator is allocated with a resource for communicating with a first UE by using a second frequency resource of a second mobile network operator.

According to FIG. 7B, a first base station 722 of a first mobile network operator 720 may transmit or exchange information for determining usage of the first base station 722 with respect to a second frequency resource 750 to or with a second base station 732 of a second mobile network operator 730 or an independent frequency resource allocation equipment (not illustrated). In this case, the first base station 722 and the second base station 732 may be connected to each other by wire or wirelessly, and the independent frequency resource allocation equipment may be one physical equipment, or may be a function implemented by software. In this case, the independent frequency resource allocation equipment may be located independently of the first base station 722 and the second base station 732, and in this case, the independent frequency resource allocation equipment may be connected to the first base station 722 and the second base station 732 by wire or wirelessly. Further, the independent frequency resource allocation equipment may be a function implemented by software at the same location as the location of the first base station 722 or the second base station 732.

Further, various conditions or environments may be determined for the first base station 722 to transmit or exchange information for determining the usage of the first base station 722 for the second frequency resource 750 to the second base station 732 or the independent frequency resource allocation equipment. For example, in case that the frequency resource 740 of the first mobile network operator 720 is in a saturated state, or an allocated amount of the frequency resource exceeds a specific threshold value, the first base station 722 may transmit or exchange the information for determining the usage of the second frequency resource 750 to or with the second base station 732 or the independent frequency resource allocation equipment.

If the first base station 722 of the first mobile network operator 720 is unable to sufficiently secure a resource 742 for communication (770) with the other first UE 762 on the first frequency resource 740 (e.g., in case that the first frequency resource 740 is in the saturated state, or the already allocated resource amount of the first frequency resource 740 exceeds a predetermined threshold value), the first base station 722 may use some or all (752) of the second frequency resource 750 of the second mobile network operator 730 for communication (772) with the other first UE 762. In this case, the communication (770) between the first base station 722 and the other first UE 752 by using the first frequency resource 740 becomes the communication between the P-BS and the P-UE, and the communication (772) between the first base station 722 and the other first UE 762 by using the second frequency resource 750 becomes the communication between the S-BS and the S-UE. Further, the communication between the first base station 722 and the one first UE 760 by using the first frequency resource 740 becomes the communication between the P-BS and the P-UE, and the communication between the second base station 732 and the one second UE 764 by using the second frequency resource 750 also becomes the communication between the P-BS and the P-UE. Of course, the condition on which the first base station can share and use the second frequency resource is not limited to the above example.

According to an embodiment of the disclosure, the message that the first base station transmits the second base station or the independent frequency resource allocation equipment in order to use the second frequency resource may include various kinds of information. For example, the message may include information on the time and frequency domains of the resource that the first base station intends to occupy for the communication with the first UE by using the second frequency resource. Further, the message may include information that the first base station requests to allocate the time and frequency resources for the first base station to be able to use the second frequency resource. Further, the message may include information on the time and frequency resources for transmitting synchronization information (which may be interchangeably used with a synchronization signal) of the first base station to the first UE by using the second frequency resource. The synchronization information may be for the first UE to obtain synchronization with the first base station on the second frequency resource. Such synchronization information may include an existing primary synchronization signal and a secondary synchronization signal, but is not limited thereto. Further, the message may include identification information of the first mobile network operator that manages the first base station, or may include information for requesting to allocate the identification information of the first mobile network operator.

The first base station may receive a response corresponding to transmission or exchange of information for determining usage of the second frequency resource 750 from the second base station 732 or the independent frequency resource allocation equipment, and may communicate with the first UE 762 by using the second frequency resource 750 based on the received response.

Further, according to an embodiment of the disclosure, the message may be a notification notifying that the first base station will use the second frequency resource. That is, the first base station may use the second frequency resource even without receiving the response to the message from the second base station or the independent frequency resource allocation equipment. That is, the first base station may communicate with the UE by using the frequency and time resources (of the second frequency resource) that the first base station has notified the second base station or the independent frequency resource allocation equipment that the first base station will use the frequency and time resources.

According to an embodiment of the disclosure, in case that the second base station or the independent frequency resource allocation equipment is unable to permit the first base station to use the second frequency resource, it may transmit a message (e.g., NACK) including information that means unavailability to the first base station. In case that the message received from the second base station or the independent frequency resource allocation equipment includes the information that means the unavailability, the first base station may not use the second frequency resource.

According to an embodiment of the disclosure, while the first base station performs communication with the first UE by using the second frequency resource, the second base station or the independent frequency resource allocation equipment may transmit the message that means to stop the usage of the second frequency resource to the first base station. In case of receiving the message that means the usage stop, the first base station may not transmit or receive a signal to or from the first UE through the second frequency resource.

Figure 8:
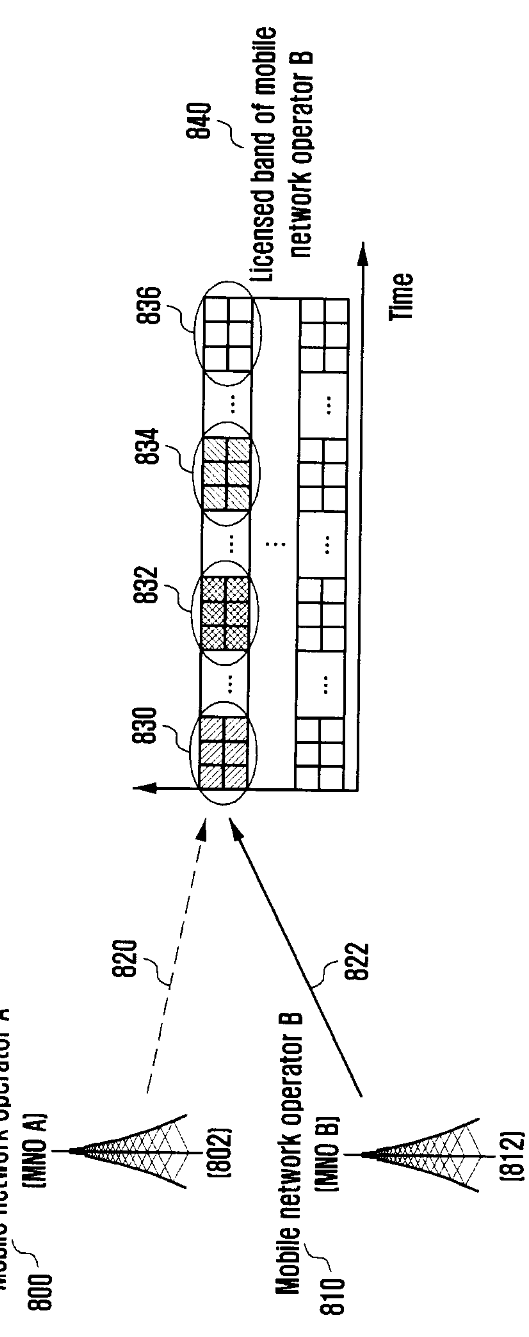
FIG. 8 is a diagram illustrating an example of a situation that may occur while a second base station 812 of a second mobile network operator on a second frequency resource over which the second mobile network operator 810 has priority and a first base station of a first mobile network operator share and use the second frequency resource.

FIG. 8 is a diagram illustrating an example of a situation that may occur while a second base station 812 of a second mobile network operator on a second frequency resource 840 over which the second mobile network operator 810 has priority and a first base station 802 of a first mobile network operator 800 share and use the second frequency resource 840.

According to FIG. 8, a case may exist, in which the first network operator does not use the second frequency resource in a situation where the second mobile network operator uses some or all of the second frequency resource (830). Further, a case may exist, in which the second mobile network operator uses some or all of the second frequency resource, and at the same time, the first network operator uses some or all of the corresponding resource (832).

Further, a case may exist, in which the first network operator uses some or all of the second frequency resource in a situation where the second mobile network operator does not use the corresponding resource (834). At last, a case may exist, in which the first network operator does not use the second frequency resource in a situation where the second mobile network operator does not use the corresponding resource (836).

Figure 9:
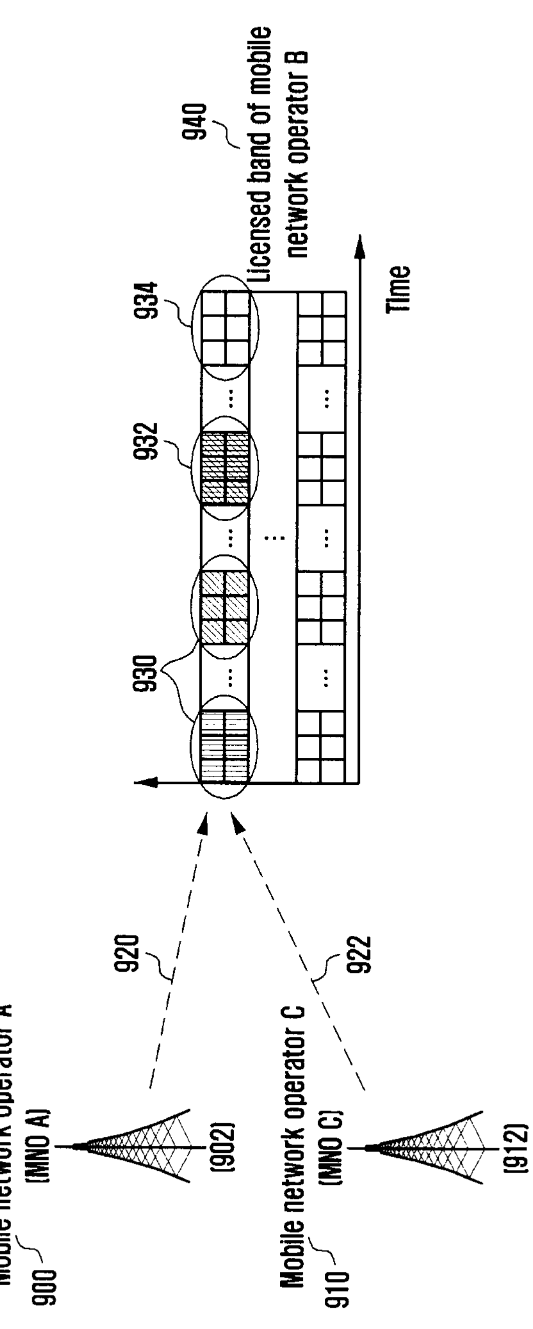
FIG. 9 is a diagram illustrating an example of a situation that may occur while a first mobile network operator and a third mobile network operator, which are a plurality of other mobile network operators that are not a second mobile network operator on a second frequency resource over which the second mobile network operator has priority, share and use the second frequency resource.

FIG. 9 is a diagram illustrating an example of a situation that may occur while a first mobile network operator and a third mobile network operator, which are a plurality of other mobile network operators that are not a second mobile network operator on a second frequency resource over which the second mobile network operator has priority, share and use the second frequency resource. According to FIG. 9, a case exists, in which a single mobile network operator uses some or all of the second frequency resource (930). Further, a case exists, in which a plurality of mobile network operators simultaneously use some or all of the second frequency resource (932). At last, a case exists, in which all mobile network operators do not use the second frequency resource (934).

FIG. 10 is a diagram illustrating an example of a method for determining whether collision has occurred in case of using the resource explained in FIGS. 8 and 9 by utilizing information on a failure resource and scheduling resource allocation information.

According to FIG. 10, "1040" means a situation where a second base station of a second mobile network operator having priority for a second frequency resource and a first base station of a first mobile network operator having no priority for the second frequency resource share the same frequency resource. "1042" means a situation where a third base station of a third mobile network operator having no priority for the second frequency resource and the first base station of the first mobile network operator having no priority for the second frequency resource share the same frequency resource.

In case that there is not information exchange between base stations of different mobile network operators, in the situation of "1040", the second base station of the second mobile network operator is unable to determine whether the failure of the transmission performed with respect to the second UE is caused by the usage of the second frequency resource by the first base station of the first mobile network operator (situation of 1021 and 1023) or is caused by deterioration of the communication channel state between the second base station and the second UE. Since first base station of the first mobile network operator uses the second frequency resource, it is unable to determine whether it exerts an influence on the performance of the second base station of the second mobile network operator. For example, the first base station of the first mobile network operator is unable to determine the transmission state of the second base station in the situation of 1022, 1023, and 1026. In the situation of "1042", the third base station of the third mobile network operator is unable to determine whether the failure of the transmission performed with respect to the third UE is caused by the usage of the second frequency resource by the first base station of the first mobile network operator (situation of 1031 and 1033) or is caused by the communication problem between the third base station and the third UE (situation of 1035). Further, since the third base station of the third mobile network operator uses the second frequency resource, it is unable to determine whether it exerts an influence on the performance of the first base station of the first mobile network operator.

In this case, the transmission failure may include a case where the UE is unable to receive the transmission signal of the base station, a case where the UE has received the transmission signal of the base station, but the decoding has failed, a case where the UE has transmitted an ACK/NACK signal to the base station, but the base station is unable to receive the signal, a case where the base station has received the ACK/NACK signal of the UE, but the decoding has failed, or all other cases where the communication between the base station and the UE has not been successful. The failure resource 1010 means a resource scheduled for the corresponding transmission in case that the transmission failure has occurred.

According to an embodiment of the disclosure, in case that the base stations of the different mobile network operators exchange the information on the failure resource and the scheduling resource allocation information, in the situation of A (1021 and 1023), the second mobile network operator may determine that the performance requirements of the second mobile network operator, which can be achieved by using the second frequency resource, have not been achieved due to the usage of the second frequency resource by the first mobile network operator. Accordingly, the second mobile network operator may determine that the situation of A corresponds to the collision due to the usage of the second frequency resource by the first mobile network operator.

In the situation of B (1020 and 1022), the second mobile network operator may determine that although the performance requirements of the second mobile network operator, which can be achieved by using the second frequency resource, have been achieved, but the interference level is increased due to the usage of the second frequency resource by the first mobile network operator. Accordingly, in this case, the second mobile network operator may determine that the situation of B corresponds to the collision due to the usage of the second frequency resource by the first mobile network operator.

In the situation of B (1026 and 1027), the second mobile network operator may determine that although the second frequency resource is not used, the interference level of an adjacent cell is increased due to the usage of the second frequency resource by the first mobile network operator. Further, in case that at least one of the situations is included, the second mobile network operator may determine that the situation corresponds to the collision due to the usage of the second frequency resource by the first mobile network operator. Further, in the situation of D (1025), the second mobile network operator may determine that the transmission failure to the second UE in the second frequency resource is not caused by the usage of the same resource by the first base station.

The subject of determining whether collision has occurred may be the first mobile network operator.

According to an embodiment of the disclosure, in the situation of E (1031 and 1033), the third base station of the third mobile network operator may determine that the gain, which can be achieved by using the second frequency resource, has not been achieved due to the usage of the second frequency resource by the first base station of the first mobile network operator. Accordingly, the third mobile network operator may determine that the situation of E corresponds to the collision due to the usage of the second frequency resource by the first mobile network operator.

In the situation of F (1030 and 1032), the third base station of the third mobile network operator may determine that although the transmission by using the second frequency resource has succeeded, the interference level is increased due to the usage of the second frequency resource by the first base station of the first mobile network operator. Accordingly, the third mobile network operator may determine that the situation of F corresponds to the collision due to the usage of the second frequency resource by the first mobile network operator.

In case of including at least one of the situations, the third mobile network operator may determine that the situation corresponds to the collision due to the usage of the second frequency resource by the first mobile network operator.

Further, in the situation of G (1035), the third mobile network operator may determine that the transmission failure to the third UE on the third frequency resource is not caused by the usage of the same resource by the first base station. The subject of determining whether collision of the third base station of the third mobile network operator has occurred may be the first base station of the first mobile network operator.

The embodiments of determining whether the collision has occurred can be applied even to a case where a plurality of base stations share the resource, and the collision determination criterion may be a combination of the embodiments.

Figure 11:
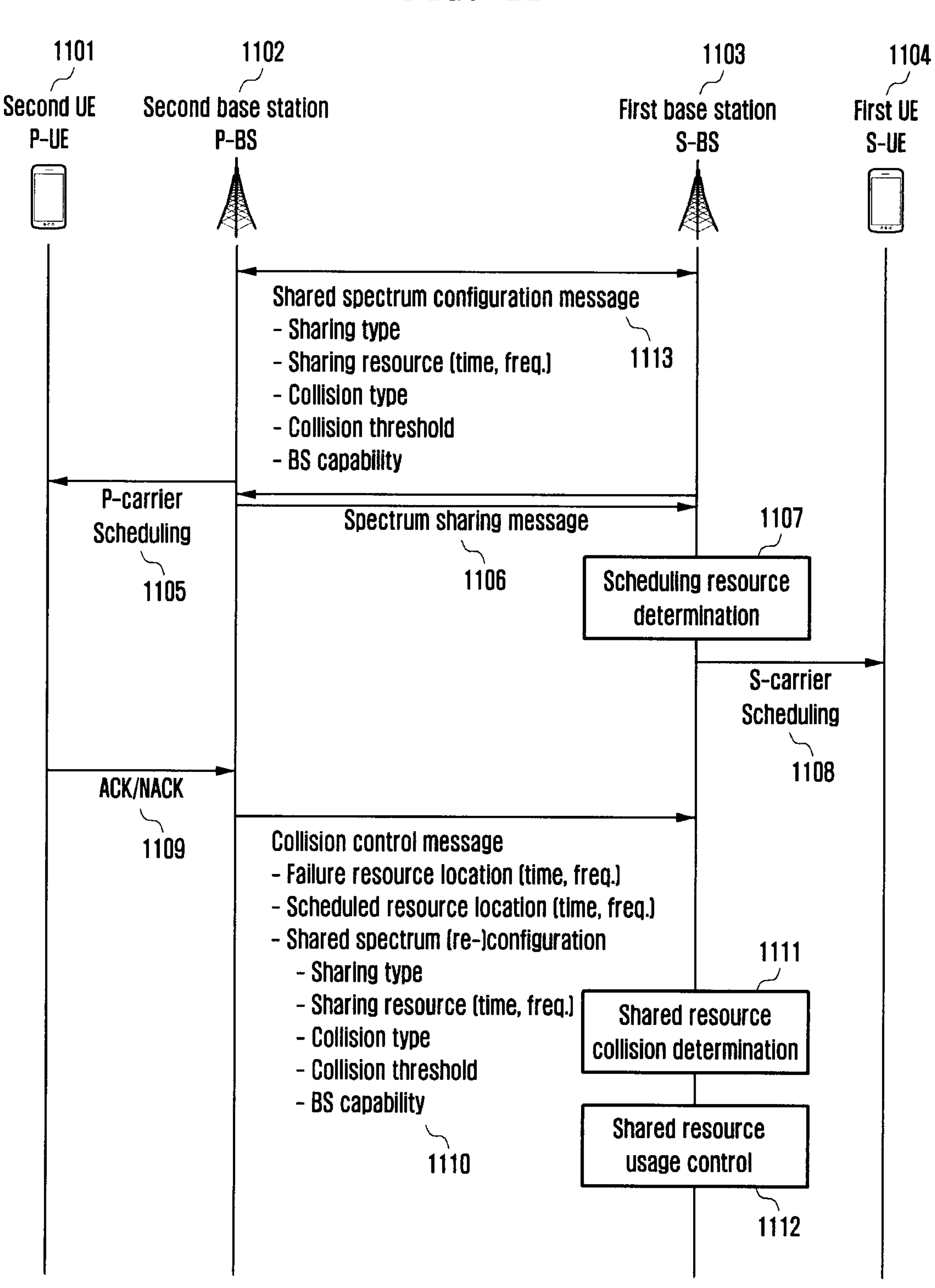
FIG. 11 is a flowchart illustrating an example of a process in which a first base station of a first mobile network operator becomes the subject of determining whether collision has occurred and controls the collision on a second frequency resource in case that a base station of a second mobile network operator having priority of using the second frequency resource and a base station of the first mobile network operator having no priority of using the second frequency resource share and use the second frequency resource.

FIG. 11 is a flowchart illustrating an example of a process in which a first base station of a first mobile network operator becomes the subject of determining whether collision has occurred and controls the collision on a second frequency resource in case that a base station of a second mobile network operator having priority of using the second frequency resource and a base station of the first mobile network operator having no priority of using the second frequency resource share and use the second frequency resource.

According to FIG. 11, base stations 1102 and 1103 of respective mobile network operators may perform scheduling of UEs 1101 and 1104 on the frequency resource owned or managed by the base stations themselves (1105). In case that the base station 1102 of the second mobile network operator having priority of using the second frequency resource performs scheduling for the second frequency resource, such scheduling may be understood as scheduling of the P-UE by using the P-carrier.

In case of using the shared spectrum technology, the second base station of the second mobile network operator may transmit and receive a spectrum sharing message to and from the first mobile network base station so that the second base station shares and uses the second frequency resource within the limit that does not infringe on the priority of the second frequency resource (1106). The spectrum sharing message may include at least one piece of information of a mobile network operator identifier (MNO ID), channel state information (which may be channel state information being supported by the LTE or LTE-A or NR) on the second frequency resource and/or strength information of a wireless signal (such strength information of the wireless signal may be included for each UE or UE group), such as a signal-to-interference-plus-noise ratio (SINR), a reference signal received power (RSRP), a reference signal received quality (RSRQ), or a channel quality indicator (CQI) on the second frequency resource, priority information of each UE, such as an identifier of each UE or UE group and PF value information of each UE or UE group, and average throughput, channel information and UE information, such as a traffic amount to be processed for each UE or UE group and/or the traffic priority, a resource sharing type, a location of the resource scheduled on the shared resources in the time or frequency domain, a collision type, a collision criterion, a base station (BS) capability, or a base station location. The priority information corresponds to information that may be an input value of an algorithm for UE scheduling by the base station. As an example, in case that the base station uses proportional fairness scheduling, the information may be the PF value information. In case that the base station uses another scheduling algorithm except the proportional fairness scheduling, the information may be a parameter for usage of the other algorithm.

The first base station of the first mobile network operator may determine (1107) the usage of the second frequency resource based on the spectrum sharing message, and may perform scheduling of the first UE on the corresponding resource (1108). Since such scheduling is that the base station of each mobile network operator schedules the UE by using the frequency resource of another operator, it may be understood as scheduling of the S-UE by using the S-carrier.

In order to grasp the collision due to the scheduling by the first base station of the first mobile network operator, the second base station of the second mobile network operator may transmit, to the first base station, a collision control message including at least one of a frequency band of a failure resource, transmission time information of the failure resource, a frequency band of a resource on which the second UE is scheduled, or transmission time information of the resource on which the second UE is scheduled (1110). The second base station may identify the information on the failure resource based on the ACK/NACK signal 1109 received from the second UE. The first base station determines whether the collision has occurred on the second frequency resource based on the message received from the second base station (1111), and control the usage of the shared resource on the second frequency resource in case that the collision criterion is not satisfied (1112).

The case where the collision criterion is satisfied means that the collision rate of a specific resource is equal to or lower than a predetermined collision rate.

For example, the case where the collision criterion is satisfied in the first base station means that the collision rate of the second resource that occurs due to the usage of the second resource by the first UE is equal to or lower than the predetermined collision rate, and the case where the collision criterion is not satisfied means that the collision rate of the second resource that occurs due to the usage of the second resource by the first UE is equal to or higher than the predetermined collision rate. A plurality of first UEs may be provided.

The system variable needed to determine collision of the shared resources or to control the usage of the shared resources may include at least one piece of information of a resource sharing type on the shared resources, a frequency band of the shared resources, a shared time of the shared resources, a shared time interval, a shared resource transmission power table, a shared resource MCS table, a collision definition delimiter, a collision reference value, a time interval of collision determination, a frequency interval of collision determination, whether to perform collision determination of a base station, base station (BS) capability, and a base station location.

The second base station may transfer the information in advance to the first base station through a shared spectrum configuration message, and the first base station may request information required for the first base station in relation to the information from the second base station (1113). Further, the information may be included in the spectrum sharing message. Further, the information may be included in the collision control message (1110). Further, the information may be defined in advance, and thus the exchange may not be required.

In case that base stations of a plurality of mobile network operators having no priority on the second frequency resource and the second base station of the second mobile network operator simultaneously share the second frequency resource, the second base station may individually perform the above operation with the respective base stations, and may transmit the same collision control message to all the base stations. The disclosure is not limited by the corresponding types.

Figure 12:
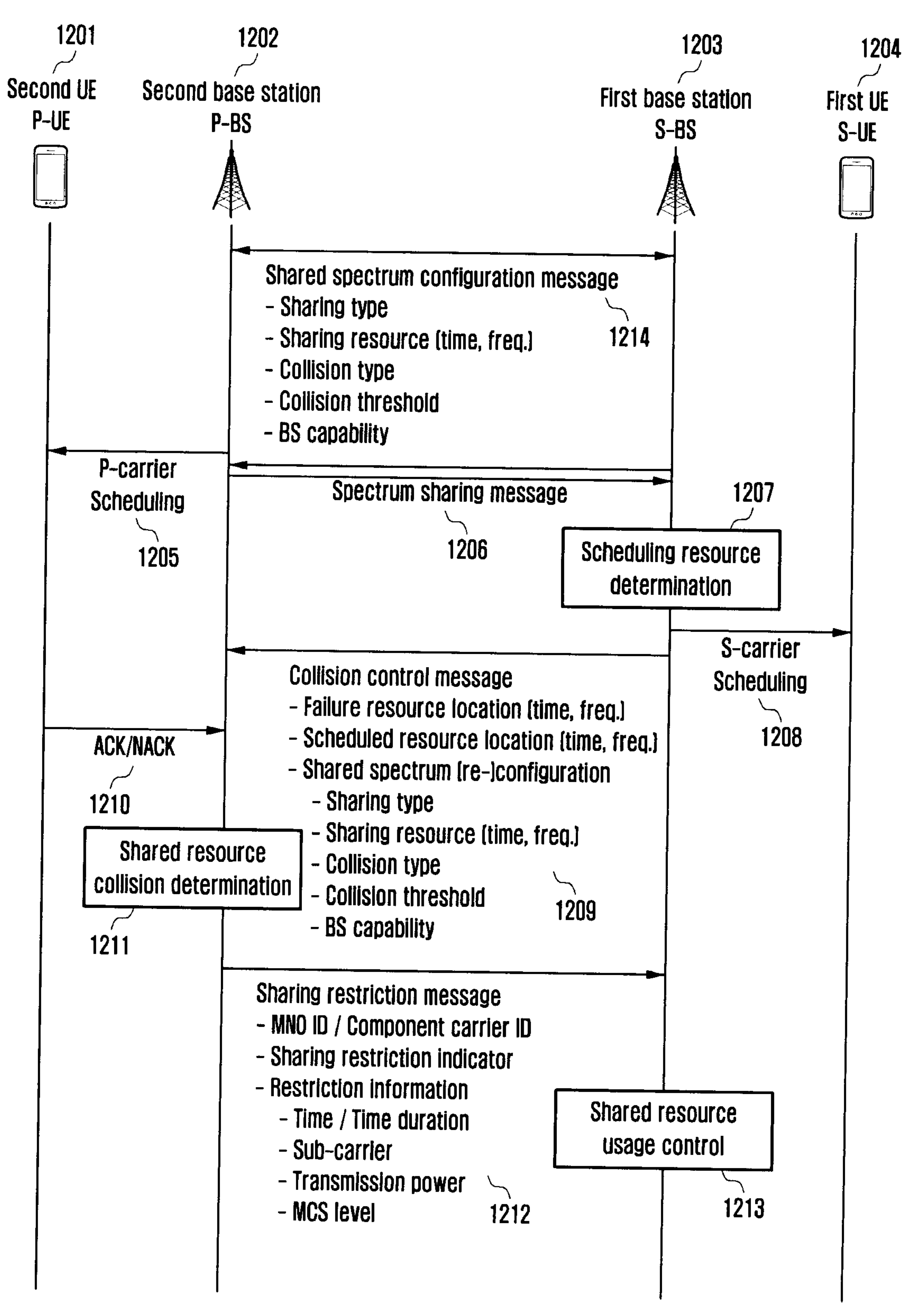
FIG. 12 is a flowchart illustrating an example of a process in which a second base station of a second mobile network operator becomes the subject of determining whether collision has occurred and controls the collision on a second frequency resource in case that the base station of the second mobile network operator having priority of using the second frequency resource and a base station of a first mobile network operator having no priority of using the second frequency resource share and use the second frequency resource.

FIG. 12 is a flowchart illustrating an example of a process in which a second base station of a second mobile network operator becomes the subject of determining whether collision has occurred and controls the collision on a second frequency resource in case that the base station of the second mobile network operator having priority of using the second frequency resource and a base station of a first mobile network operator having no priority of using the second frequency resource share and use the second frequency resource.

According to FIG. 12, base stations 1202 and 1203 of respective mobile network operators may perform scheduling of UEs 1201 and 1204 on the frequency resource owned or managed by the base stations themselves (1205). In case that the base station 1202 of the second mobile network operator having priority of using the second frequency resource performs scheduling for the second frequency resource, such scheduling may be understood as scheduling of the P-UE by using the P-carrier.

In case of using the shared spectrum technology, the second base station of the second mobile network operator may transmit and receive a spectrum sharing message to and from the first mobile network base station so that the second base station shares and uses the second frequency resource within the limit that does not infringe on the priority of the second frequency resource (1206). The first base station of the first mobile network operator may determine (1207) the usage of the second frequency resource based on the spectrum sharing message, and may perform scheduling of the first UE on the corresponding resource (1208). Since such scheduling is that the base station of each mobile network operator schedules the UE by using the frequency resource of another operator, it may be understood as scheduling of the S-UE by using the S-carrier.

In order to grasp the collision in the second frequency band due to the scheduling by the first base station of the first mobile network operator, the first base station transmits, to the second base station, a collision control message including at least one of a frequency band of a resource scheduled to the first UE, transmission time information of the resource scheduled to the first UE, a frequency band of a failure resource of the first UE, or transmission time information of the failure resource. The second base station of the second mobile network operator determines whether the collision has occurred on the second frequency resource based on at least one of a ACK/NACK signal 1210 received from the second UE, the frequency band of the failure resource of the second UE, transmission time information of the failure resource, the frequency band of the resource on which the second UE is scheduled, transmission time information of the resource on which the second UE is scheduled, or the collision control message received from the first base station (1211). The second base station may identify the information on the failure resource based on the ACK/NACK signal 1210 received from the second UE. In case that the collision criterion is not satisfied, the second base station may transmit, to the first base station, a sharing restriction message including information for controlling the usage of the shared resources on the second frequency resource (1212). The first base station controls the usage of the shared resources on the second frequency resource based on the received sharing restriction message (1213).

According to an embodiment of the disclosure, in the process of determining whether the second frequency resource has collided (1211), the second base station of the second mobile network operator may determine whether the second frequency resource has collided based on a collision control message received from the base station of the single mobile network operator that does not have the priority of using the second frequency resource. Further, the second base station may determine whether the second frequency resource has collided based on the collision control message received from the base stations of a plurality of mobile network operators. For example, the second base station determines whether the collision has occurred with respect to the first base station and the third base station based on the collision control message received from the first base station of the first mobile network operator and the third base station of the third mobile network operator. Further, in case that the sum of the respective collision resources does not satisfy the collision criterion of the second base station although the collision criterion on the second frequency resource is satisfied with respect to the individual base station, the second base station may determine that the collision has occurred. In this case, the second base station may transmit the sharing restriction message including information for controlling the usage of the shared resource on the second frequency resource to the first base station and the third base station.

The system variables needed to determine whether the shared resources have collided or to control the usage of the shared resources may include at least one piece of information of a resource sharing type on the shared resources, a frequency band of the shared resources, a shared time of the shared resources, a shared time interval, a shared resource transmission power table, a shared resource MCS table, a collision definition delimiter, a collision reference value, a time interval for determining whether the collision has occurred, a frequency interval for determining whether the collision has occurred, whether the base station has performed determination of whether the collision has occurred, base station (BS) capability, and a base station location. The second base station may transfer, in advance, the system variables needed to determine whether the shared resources have collided or to control the usage of the shared resources to the first base station through a shared spectrum configuration message, and the first base station may request information required for the first base station in relation to the information from the second base station (1214). Further, the information may be included in the spectrum sharing message. Further, the information may be included in the collision control message. Further, the information may be included in the sharing restriction message (1212). Further, the information may be defined in advance, and thus the exchange thereof may not be required.

Figure 13A:
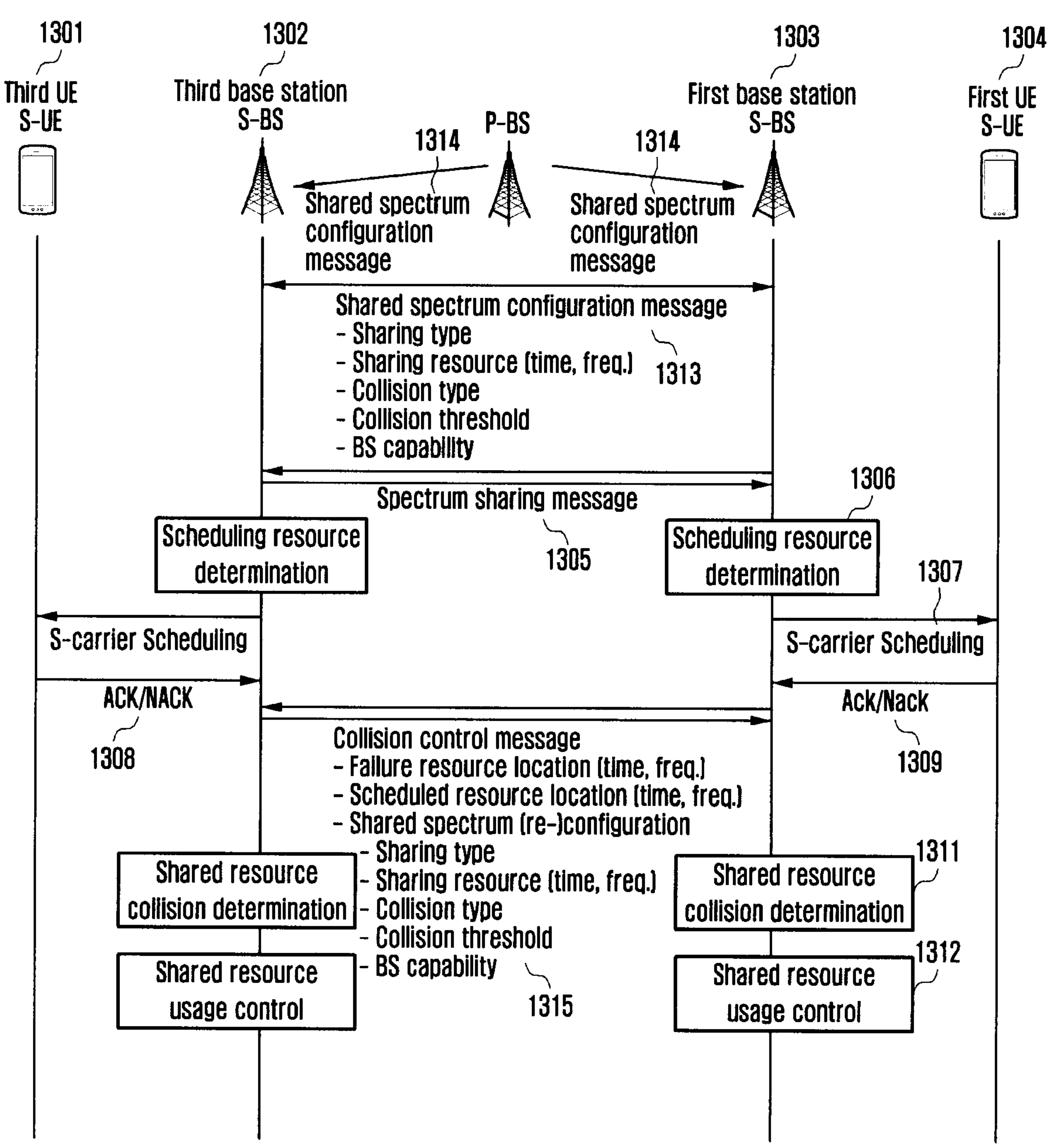
FIG. 13A is a flowchart illustrating an example of a process in which base stations of a plurality of mobile network operators having no priority of using a second frequency resource become each the subject of determining whether collision has occurred and control the collision on a second frequency resource in case that the base stations share and use the second frequency resource.

FIG. 13A is a flowchart illustrating an example of a process in which base stations of a plurality of mobile network operators having no priority of using a second frequency resource become each the subject of determining whether collision has occurred and control the collision on a second frequency resource in case that the base stations share and use the second frequency resource.

According to FIG. 13A, in case of using the shared spectrum technology, the second base station of the second mobile network operator may transmit and receive a spectrum sharing message to and from base stations of a plurality of mobile network operators (a first base station 1303 of a first mobile network operator and a third base station 1302 of a third mobile network operator) so that the second base station shares and uses the second frequency resource within the limit that does not infringe on the priority of the second frequency resource. The spectrum sharing message can be transmitted and received even between the plurality of mobile network operators (1305). Each base station may determine the usage of the frequency resource corresponding to each base station based on the spectrum sharing message (1306), and may perform scheduling of each UE on the corresponding resource (1307). Since such scheduling is that the base station of each mobile network operator schedules the UE by using the frequency resource of another operator, it may be understood as scheduling of the S-UE by using the S-carrier.

In order to grasp the collision on the second frequency resource due to the scheduling by the first base station of the first mobile network operator, the first base station receives, from the third base station, a collision control message including at least one of a frequency band of a failure resource of the third base station 1302 of the third mobile network operator, a frequency band of a resource on which the third UE has been scheduled, or transmission time information (1315). The first base station may determine whether the second frequency resource has collided based on at least one of the received message and the frequency band of the resource on which the first UE has been scheduled, transmission time information of the resource on which the first UE has been scheduled, the frequency band of the failure resource for the first UE 1304, or transmission time information of the failure resource (1311). The first base station may identify the information on the failure resource based on the ACK/NACK signal 1307 received from the first UE. In case that the collision criterion is not satisfied, the first base station controls the usage of the shared resource on the second frequency resource (1312).

The second base station may transfer, in advance, the system variables needed to determine whether the shared resources have collided or to control the usage of the shared resources to the base station of another mobile network operator that uses the second frequency resource through a shared spectrum configuration message (1314). Further, the third base station may transfer the system variables to the first base station through the shared spectrum configuration message, or the first base station may request information needed for the first base station in relation to the information from the third base station (1313). Further, the system variables may be included in the spectrum sharing message. Further, the system variables may be included in the collision control message. Further, the system variables may be defined in advance, and thus the exchange thereof may not be required.

The above example has been described from the perspective of the first base station, and the third base station 1302 may also perform the same operation as the above operation.

Figure 13B:
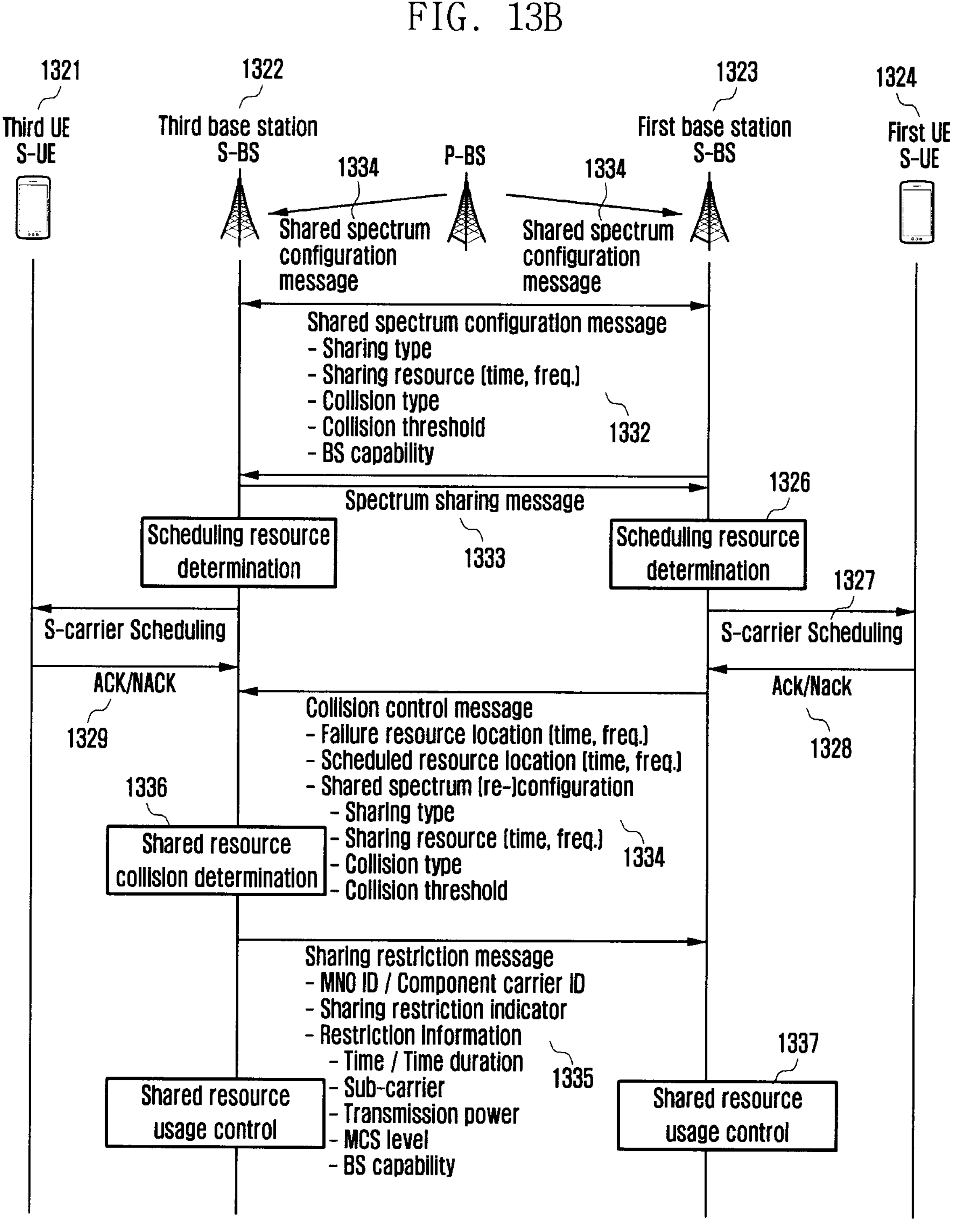
FIG. 13B is a flowchart illustrating an example of a process in which a specific base station 1317 becomes the subject of determining whether collision has occurred and controls the collision on a second frequency resource in case that base stations of a plurality of mobile network operators having no priority of using the second frequency resource share and use the second frequency resource.

FIG. 13B is a flowchart illustrating an example of a process in which a specific base station 1321 becomes the subject of determining whether collision has occurred and controls the collision on a second frequency resource in case that base stations of a plurality of mobile network operators having no priority of using the second frequency resource share and use the second frequency resource.

According to FIG. 13B, operations until the exchange of the collision control message 1334 are performed in the same manner as those in case of FIG. 13A.

The first base station 1324 that does not perform the determination of whether the shared resources have collided transmits, to the third base station (master S-BS) 1322 that becomes the subject of determining whether the collision has occurred, the collision control message including the frequency band of the resource on which the first UE is scheduled, the transmission time information of the resource on which the first UE is scheduled, the frequency band of the failure resource by the first UE, or the transmission time information of the failure resource by the first UE (1334). The third base station of the third mobile network operator may determine whether the second frequency resource has collided based on at least one of the frequency band of the failure resource by the third UE, the transmission time information of the failure resource by the third UE, the frequency band of the resource on which the third UE is scheduled, the transmission time information of the resource on which the third UE is scheduled, or the collision control message received from the first base station (1336). The respective base stations may identify the information on the failure resource based on the ACK/NACK signals 1328 and 1329 received from the scheduled UEs. In case that the collision criterion is not satisfied, the sharing restriction message including the information for controlling the usage of the shared resources on the second frequency resource is transmitted to the first base station (1335). The first base station controls the usage of the shared resources on the second frequency resource based on the received message (1337).

Figure 14:
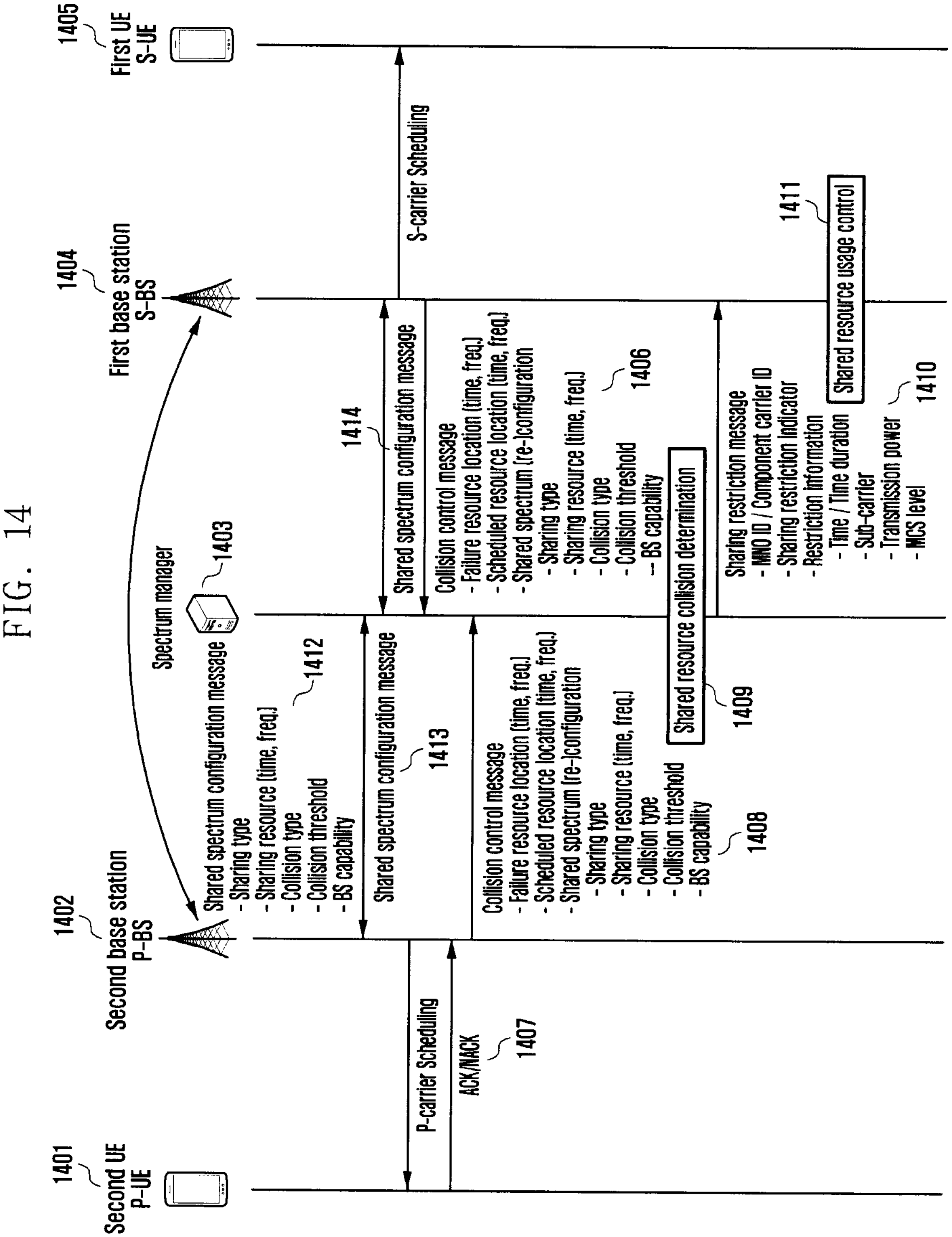
FIG. 14 is a flowchart illustrating an example of a process in which a separate spectrum manager becomes the subject of determining whether collision has occurred and controls the collision on a second frequency resource in case that a base station of a second mobile network operator having priority of using the second frequency resource and a base station of a first mobile network operator having no priority of using the second frequency resource share and use the second frequency resource.

FIG. 14 is a flowchart illustrating an example of a process in which a separate spectrum manager (SM) (or frequency resource controller) 1403 becomes the subject of determining whether collision has occurred and controls the collision on a second frequency resource in case that a base station of a second mobile network operator having priority of using the second frequency resource and a base station of a first mobile network operator having no priority of using the second frequency resource share and use the second frequency resource.

The spectrum manager may serve to receive information from base stations of a plurality of mobile network operators, to determine whether a shared resource has collided, and to control the collision occurring on the corresponding shared resource. The spectrum manager may be one piece of physical equipment, or may be a function implemented by software. In this case, the spectrum manager may be located independently of the first base station 1404 and the second base station 1402, and in this case, the first base station 1404 and the second base station 1402 may be connected to each other by wire or wirelessly. Further, the spectrum manager may be the function implemented by software at the same location as that of the first base station 1404 or the second base station 1402.

According to FIG. 14, in order to grasp the collision on the second frequency resource due to the scheduling by the first base station of the first mobile network operator, the first base station of the first mobile network operator transmits, to the spectrum manager, the collision control message including at least one of the frequency band of the resource on which the first UE is scheduled, the transmission time information of the resource on which the first UE is scheduled, the frequency band of the failure resource, or the transmission time information of the failure resource (1406). The second base station of the second mobile network operator transmits, to the spectrum manager, the collision control message including at least one of the frequency band of the resource on which the second UE is scheduled, the transmission time information of the resource on which the second UE is scheduled, the frequency band of the failure resource by the second UE, or the transmission time information of the failure resource (1408). The second base station may identify the information on the failure resource based on the ACK/NACK signal 1407 received from the second UE. The spectrum manager determines whether the second frequency resource has collided based on the received information (1409), and in case that the collision criterion is not satisfied, the second base station transmits, to the first base station, a message including information for controlling the usage of the shared resources on the second frequency resource (1410). The first base station controls the usage of the shared resources on the second frequency resource based on the received message (1411).

The second base station may transfer, in advance, the system variables needed to determine whether the shared resources have collided or to control the usage of the shared resources to the first base station through the shared spectrum configuration message, and may request information needed for the first base station in relation to the information from the second base station (1412). Further, the second base station may transfer the system variables through the shared spectrum configuration message to the spectrum manager (1413). Further, the spectrum manager may transfer the system variables to the first base station through the shared spectrum configuration message. Further, the system variables may be included in the resource sharing message. Further, the system variables may be included in the collision control message. Further, the system variables may be included in the sharing restriction message. Further, the system variables may be defined in advance, and thus the exchange thereof may not be required.

Figure 15:
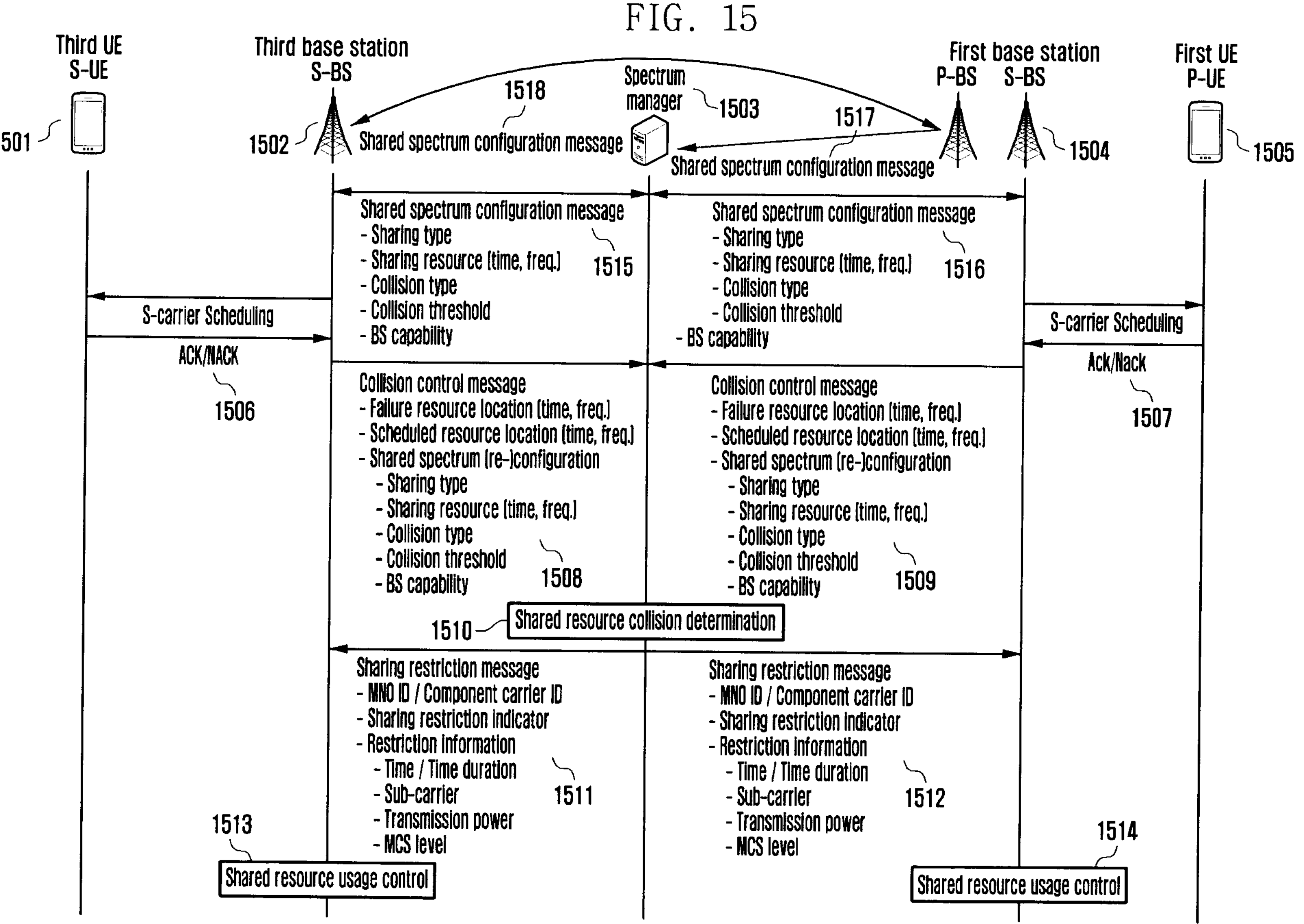
FIG. 15 is a flowchart illustrating an example of a process in which a separate spectrum manager becomes the subject of determining whether collision has occurred and controls the collision on a second frequency resource in case that base stations of a plurality of mobile network operators having no priority of using the second frequency resource share and use the second frequency resource.

FIG. 15 is a flowchart illustrating an example of a process in which a separate spectrum manager becomes the subject of determining whether collision has occurred and controls the collision on a second frequency resource in case that base stations of a plurality of mobile network operators having no priority of using the second frequency resource share and use the second frequency resource.

According to FIG. 15, in order to grasp the collision on the second frequency resource due to the scheduling by the first base station 1504 of the first mobile network operator, the first base station transmits, to the spectrum manager, the collision control message including at least one of the frequency band of the resource on which the first UE is scheduled, the frequency information of the failure resource related to the first UE 1505, or the transmission time information (1509). Further, in order to grasp the collision on the second frequency resource due to the scheduling by the third base station of the third mobile network operator, the third base station 1502 of the third mobile network operator also transmits, to the spectrum manager, the collision control message including at least one of the frequency band of the resource on which the third UE is scheduled, the transmission time information of the resource on which the third UE is scheduled, the frequency information of the failure resource by the third UE 1501, or the transmission time information of the third UE 1501 (1508). The third base station may identify the information on the failure resource based on the ACK/NACK signal 1506 received from the third UE. The spectrum manager determines whether the second frequency resource has collided based on the received information (1510), and in case that the collision criterion is not satisfied, the spectrum manager transmits, to the first base station and the third base station, the sharing restriction message including the information for controlling the usage of the shared resources on the second frequency resource (1512 and 1511). The first base station controls the usage of the shared resources on the second frequency resource (1514) based on the received sharing restriction message (1512). The third base station also controls the usage of the shared resources on the second frequency resource (1513) based on the received sharing restriction message (1511).

The second base station may transfer, in advance, the system variables needed to determine whether the shared resources have collided or to control the usage of the shared resources to another base station through the shared spectrum configuration message, and may request information needed for the other base station in relation to the information (1518). Further, the second base station may transfer the system variables to the spectrum manager through the shared spectrum configuration message, or the spectrum manager may request the system variables from the second base station (1517). Further, the spectrum manager may transfer the system variables to the base station that intends to use the shared resource through the shared spectrum configuration message (1515 and 1516). Further, the system variables may be included in the resource sharing message. Further, the system variables may be included in the collision control message. Further, the system variables may be included in the sharing restriction message. Further, the system variables may be defined in advance, and thus the exchange thereof may not be required.

Figure 16A:
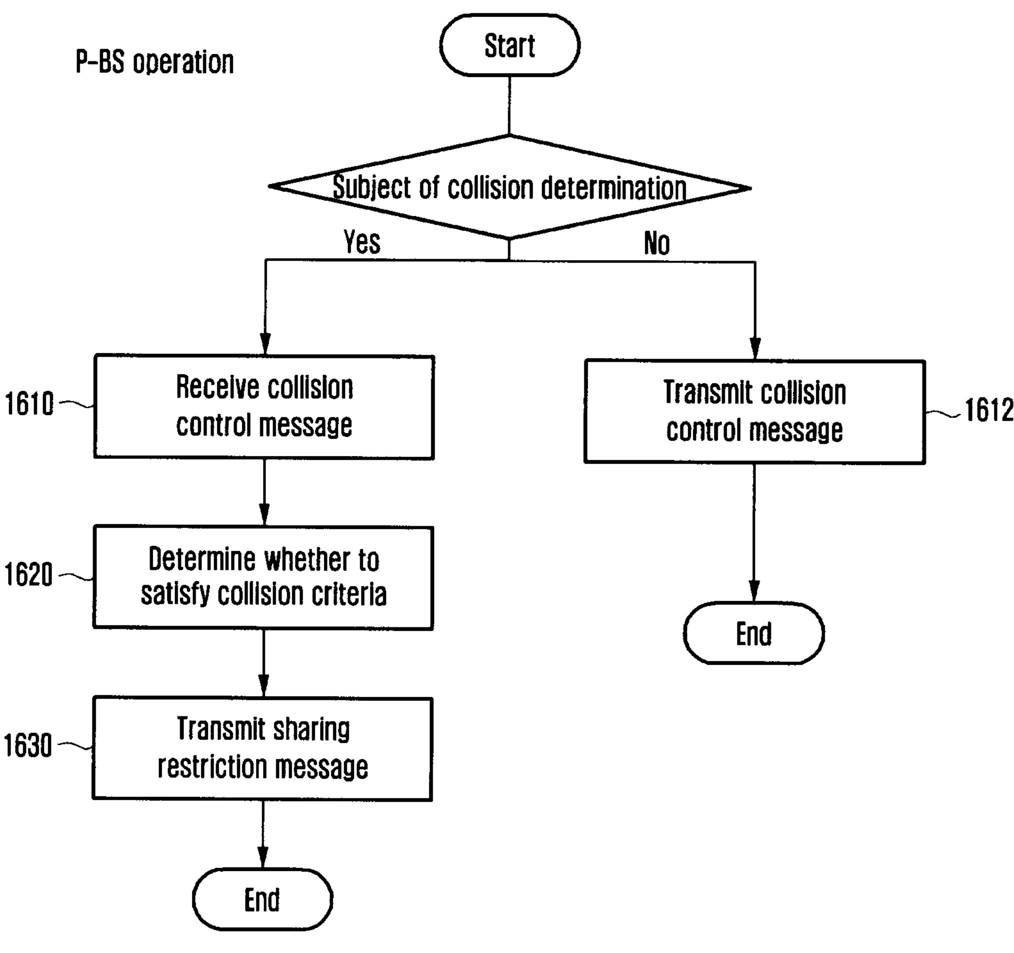
FIG. 16A is a flowchart illustrating an operation of a P-BS base station for performing a collision control function on shared resources.

FIG. 16A is a flowchart illustrating an operation of a P-BS base station for performing a collision control function on shared resources.

In case that the second base station of the second mobile network operator having priority for the second frequency resource does not perform the function of determining whether the shared resources have collided (the second base station is not the subject of determining whether the collision has occurred), the second base station transmits the collision control message to the object that performs the function of determining whether the collision has occurred (1612). In case that the second base station performs the function of determining whether the collision has occurred, the second base station receives the collision control message (1610). After performing the determination of whether the collision has occurred based on the received collision control message, the second base station transmits the sharing restriction message to the base station that requires the collision control (1630).

Figure 16B:
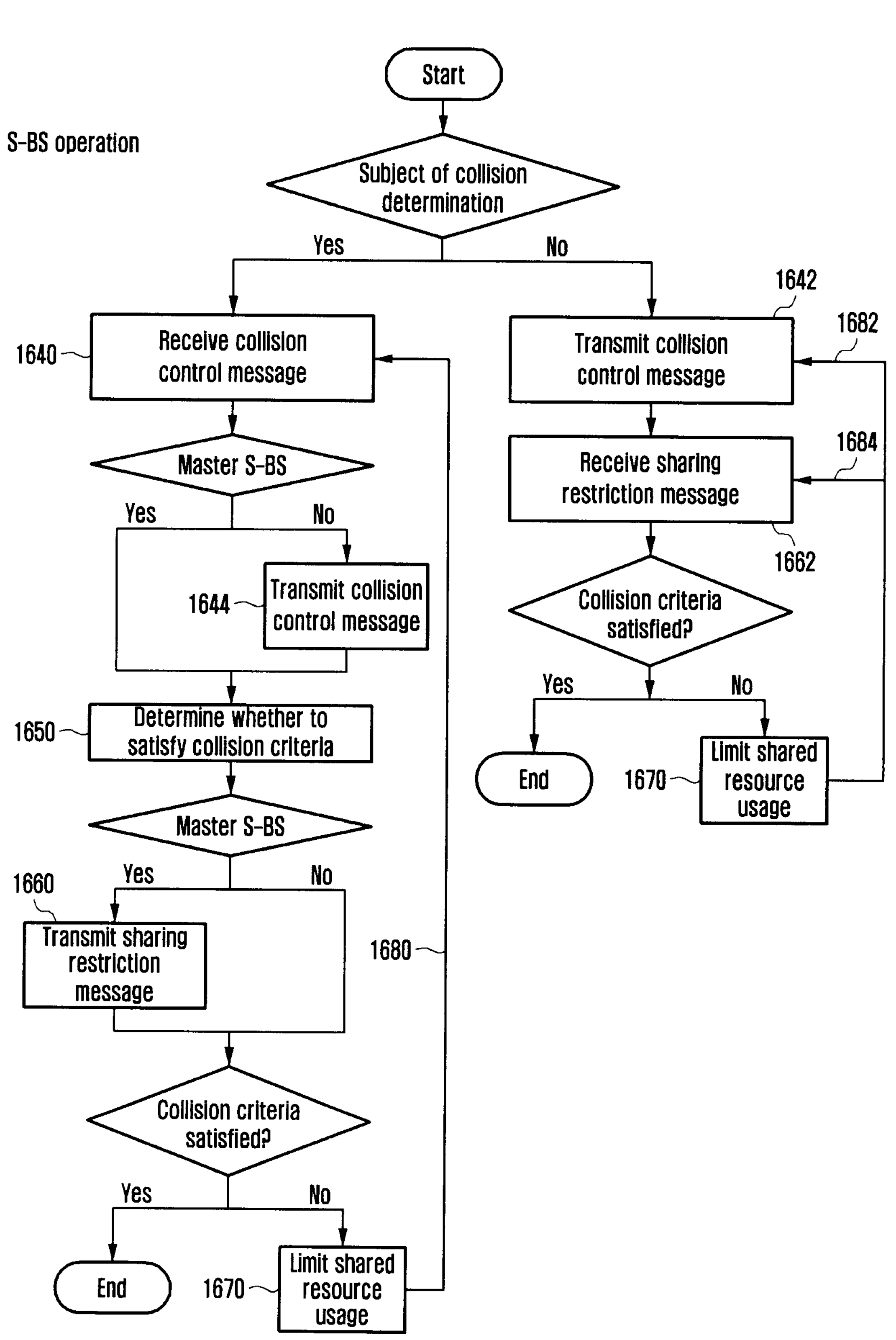
FIG. 16B is a flowchart illustrating an operation of an S-BS base station for performing a collision control function on shared resources.

FIG. 16B is a flowchart illustrating an operation of an S-BS base station for performing a collision control function on shared resources.

In case that the first base station of the first mobile network operator having no priority for the second frequency resource does not perform the function of determining whether the shared resources have collided, the first base station transmits the collision control message to the object that performs the function of determining whether the collision has occurred (1642). Thereafter, the first base station receives the sharing restriction message (1662), and identifies whether the collision criterion is satisfied. If the collision criterion is not satisfied, the first base station controls the usage of the shared resources by utilizing the information included in the sharing restriction message (1670). Thereafter, the first base station may transmit the collision control message to the object that performs the function of determining whether the collision has occurred (1682), or may wait for the reception of the sharing restriction message from the object that performs the function of determining whether the collision has occurred (1684).

In case that the first base station performs the function of determining whether the collision has occurred, the first base station receives the collision control message (1640). In case that the first base station, which performs the function of determining whether the collision has occurred, is not the S-BS, the first base station transmits the collision control message to the base station that intends to share the same shared resource (1644). After performing the determination of whether the collision has occurred based on the received collision control message (1650), the first base station transmits the sharing restriction message to the base station that requires the collision control in case that the first base station is the master S-BS (1660). Thereafter, the first base station identifies whether the collision criterion is satisfied, and if the collision criterion is not satisfied, the first base station controls the usage of the shared resources by utilizing the information included in the sharing restriction message (1670). Thereafter, the first base station may wait for the reception of the collision control message (1680).

Figure 16C:
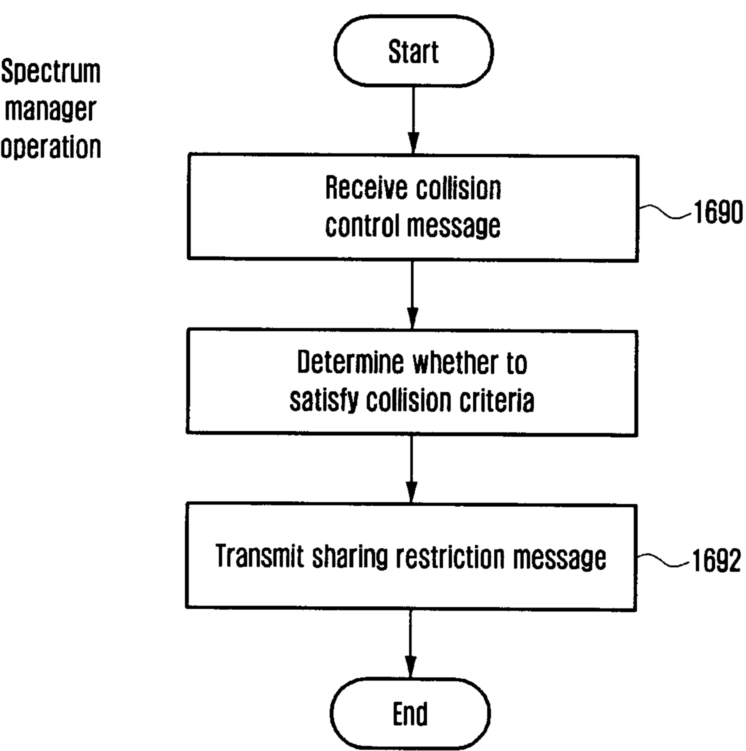
FIG. 16C is a flowchart illustrating an operation of a spectrum manager for performing a collision control function on shared resources.

FIG. 16C is a flowchart illustrating an operation of a spectrum manager for performing a collision control function on shared resources.

The spectrum manager receives the collision control message from the base stations that intend to use the shared resources (1690). The spectrum manager performs the determination of whether the resource collision has occurred through the received collision control message, and determines whether the collision criterion is satisfied. Further, in case that the collision criterion is not satisfied, the spectrum manager transmits the sharing restriction message to the base station that requires the collision control (1692).

According to an embodiment of the disclosure, the spectrum sharing message may include at least one piece of information of a mobile network operator identifier (MNO ID), channel state information (which may be channel state information being supported by the LTE or LTE-A or NR) on the second frequency resource and/or strength information of a wireless signal (such strength information of the wireless signal may be included for each UE or UE group), such as a signal-to-interference-plus-noise ratio (SINR), a reference signal received power (RSRP), a reference signal received quality (RSRQ), or a channel quality indicator (CQI) on the second frequency resource, priority information of each UE, such as an identifier of each UE or UE group and PF value information of each UE or UE group, and average throughput, channel information and UE information, such as a traffic amount to be processed for each UE or UE group and/or the traffic priority, a resource sharing type, a location of the resource scheduled on the shared resources in the time or frequency domain, a collision type, a collision criterion, a base station (BS) capability, or a base station location.

The priority information corresponds to information that may be an input value of an algorithm for UE scheduling by the base station. As an example, in case that the base station uses proportional fairness scheduling, the information may be the PF value information. In case that the base station uses another scheduling algorithm except the proportional fairness scheduling, the information may be a parameter for usage of the other algorithm. According to an embodiment of the disclosure, the collision control message may include at least one of the location of the failure resource in the time or frequency domain, the location of the resource scheduled on the shared resources in the time or frequency domain, system variables needed to determine whether the shared resources have collided or to control the usage of the shared resources (resource sharing type on the shared resources), the frequency band of the shared resources, the shared time of the shared resources, the shared time interval, the shared resource transmission power table, the shared resource MCS table, the collision definition delimiter, the collision reference value, the time interval for determining whether the collision has occurred, the frequency interval for determining whether the collision has occurred, whether the base station has performed the determination of whether the collision has occurred, the base station (BS) capability, and the base station location.

The resource sharing type may be, for example, a combination of one or more of a type of restricting the usage of the time resource of the S-BS on the S-carrier, a type of restricting the usage of the frequency resource of the S-BS on the S-carrier, a type of restricting the transmission power of the S-BS on the S-carrier, a type of restricting the MCS of the S-BS on the S-carrier, or a specific sharing type agreed between the operator or the network.

The shared resource transmission power table means a set of available transmission power values when the base station uses the resources corresponding to the respective base stations. For example, when the S-BS uses the S-carrier resource, the shared resource transmission power table may be the set of available transmission power values.

The shared resource MCS table means a set of available MCS values when the base station uses the resources corresponding to the respective base stations. For example, when the S-BS uses the S-carrier resource, the shared resource MCS table may be the set of available MCS values.

The collision definition delimiter means a delimiter representing which of several situations, which can be determined as collision, can be determined as the collision. For example, among several collision situations A to F defined in FIG. 10, which can be determined as the collision, the first base station may determine the situation of A and C as the collision, and the second base station may determine only the situation of D as the collision. Accordingly, depending on the collision definition delimiter, whether the collision has occurred by the base station may differ even in the same situation.

The base station (BS) capability means information related to the base station. For example, the base station capability may include whether the base station implements the spectrum sharing function, a spectrum sharing operable frequency resource band of the base station, whether the function of determining whether the shared resources have collided is implemented, and information on whether the shared resource usage control function is implemented.

According to an embodiment of the disclosure, non-achievement of the collision criterion may correspond to a case where the collision resource rate in the time domain does not satisfy the threshold value criterion. The case where the rate of the resource on which the collision has occurred for a specific time in one or more subcarriers in a specific frequency resource does not satisfy the threshold value may be determined as collision criterion non-achievement.

Further, the determination of the collision criterion non-achievement may correspond to a case where the rate of the collision resources in the frequency domain does not satisfy the threshold value criterion. The case where the rate of the frequency resource on which the collision has occurred among some or all of the specific frequency resource bands for a specific time or specific time interval does not satisfy the threshold value may be determined as the collision criterion non-achievement.

Further, the determination of the collision criterion non-achievement may correspond to a case where the data throughput of the second base station of the second mobile network operator having priority for the second frequency resource does not satisfy the threshold criterion. In case that the throughput of data being transmitted to the second UE deviates from the threshold value, the second base station may determine that the collision on the second frequency resource does not achieve the collision criterion. Further, the determination of whether the collision has occurred may correspond to a case where at least one of the criteria is complexly applied.

The corresponding disclosure is not limited to the above embodiment, and the operator that owns or manages the frequency resource may optionally configure the variables.

According to an embodiment of the disclosure, the sharing restriction message may include at least one of a collision criterion non-achievement base station delimiter, whether the collision criterion is not achieved, the collision control type, a sharing restriction time in the time domain, a sharing restriction band in the frequency domain, the transmission power value on the shared resources, an MCS value on the shared resources and a specific variable value designated by the operator having priority for the shared resources, and system variables needed to determine whether the shared resources have collided or to control the usage of the shared resources (the resource sharing type on the shared resources, the frequency band of the shared resources, the shared time of the shared resources, the shared time interval, the shared resource transmission power table, the shared resource MCS table, the collision definition delimiter, the collision reference value, the time interval for determining whether the collision has occurred, the frequency interval for determining whether the collision has occurred, whether the base station has performed the determination of whether the collision has occurred, the BS capability, and the base station location.

According to an embodiment of the disclosure, an example of the collision control may be sharing restriction in the time domain. The base station having received the sharing restriction message or the base station having determined that the collision criterion in the shared resources has not been achieved may control to achieve the collision criterion by lowering the collision occurrence rate in a manner that the corresponding shared resource is not used for a specific time interval. The base station may perform rescheduling of the corresponding UE so that the corresponding UE does not use the corresponding shared resource for a specific time interval. For example, in case that the first base station determines that the collision due to the first UE has occurred on the second resource in the situation as in FIG. 11, the first base station performs the scheduling again so that the first UE does not use the second resource for a predetermine time period. The time period in which the shared resource is not used may be a value transmitted in the field of the sharing restriction message, or may be an optional value configured by the base station. For example, the collision rate is defined as the number k of collision resources for a specific time P, and if the collision rate is higher than a predetermined collision rate $\alpha$, the usage of the shared resources is restricted for $N(\geq k/\alpha - P)$ slots.

Further, the collision control may also be sharing restriction in the frequency domain. The base station having received the sharing restriction message or the base station having determined that the collision criterion on the shared resources has not been achieved may control to achieve the collision criterion by lowering the collision occurrence rate in a manner that the corresponding shared resource is not used for a specific time interval. The base station may perform rescheduling of the corresponding UE so that the corresponding UE does not use the corresponding shared resource for a specific time interval. For example, in case that the first base station determines that the collision due to the first UE has occurred on the second resource in the situation as in FIG. 11, the first base station performs the scheduling again so that the first UE does not use the second resource for a predetermine frequency band. The frequency band in which the shared resource is not used may be a value transmitted in the field of the sharing restriction message, or may be an optional value configured by the base station. For example, the collision rate is defined as the number k of collision resources for a specific frequency band Q, and if the collision rate is higher than a predetermined collision rate $\alpha$, the usage of the shared resources is restricted in $N(\geq k/\alpha - Q)$ subcarrier bands.

Further, the collision control may also be transmission power restriction of the base station or the UE on the corresponding shared resources. The base station having received the sharing restriction message or the base station having determined that the collision criterion on the shared resources has not been achieved may control to achieve the collision criterion by lowering the transmission power of the base station or the UE on the corresponding shared resources. The transmission power on the shared resources may be a value transmitted in the field of the sharing restriction message, or may be an optional value configured by the base station. For example, the collision rate is calculated as the number k of collision resources for a specific period P or frequency band period Q, and if the collision rate is higher than a predetermined collision rate α, the transmission power of the base station or the UE is restricted.

Further, the collision control may also be MCS restriction on the corresponding shared resources. The base station having received the sharing restriction message or the base station having determined that the collision criterion on the shared resources has not been achieved may control to achieve the collision criterion by lowering the MCS during data transmission on the corresponding shared resources. The MCS on the shared resources may be a value transmitted in the field of the sharing restriction message, or may be an optional value configured by the base station. For example, the collision rate is calculated as the number k of collision resources for a specific period P or frequency band period Q, and if the collision rate is higher than a predetermined collision rate α, the maximum MCS level of the corresponding base station is restricted.

Further, the collision control method may correspond to a case where at least one of the above criteria is complexly applied.

The corresponding disclosure is not limited to the above embodiment, and the operator that owns or manages the frequency resource or the operator that uses the shared resources can optionally configure the variables.

It is not required to necessarily perform all constituents disclosed in the drawing, and at least some of the illustrated constituents can be omitted, or constituents not illustrated can be further executed. Further, it is also possible to perform the illustrated constituents in a changed order.

Further, the embodiments disclosed in the disclosure are not exclusive, and it is also possible that one or more embodiments disclosed in the disclosure are combined with each other to be performed.

Figure 17:
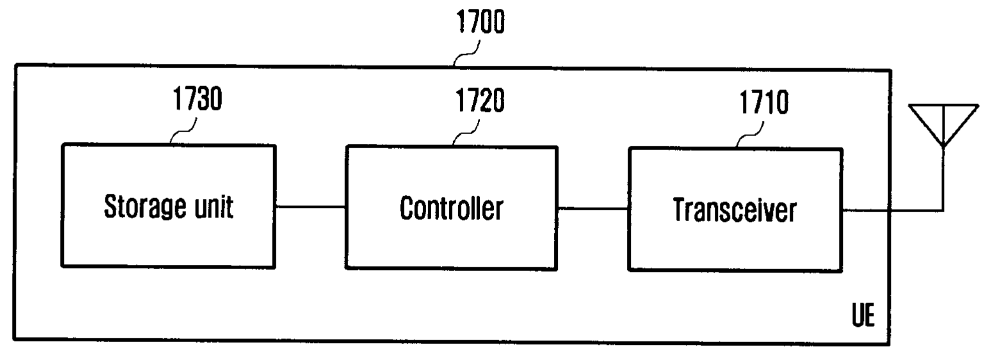
FIG. 17 is a block diagram illustrating a UE and a base station device that can perform the disclosure.
Figure 17:
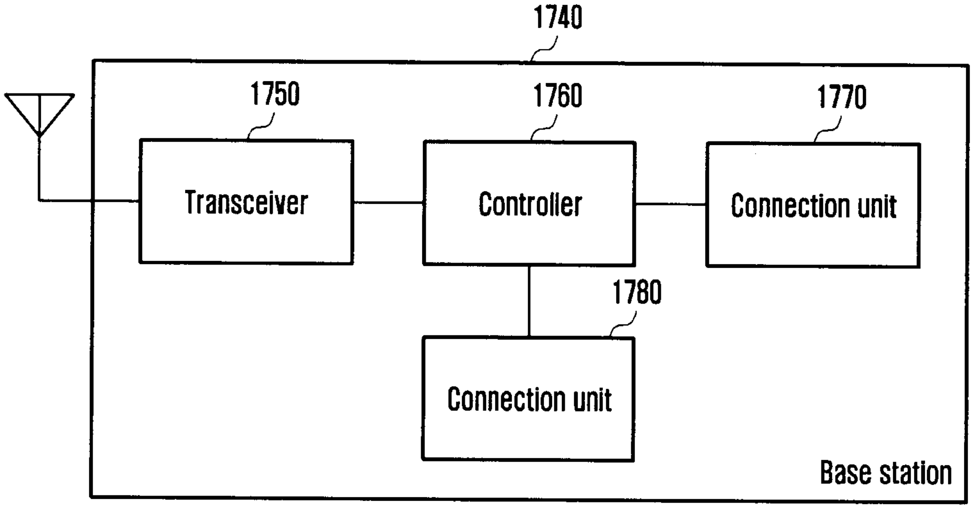

FIG. 17 is a block diagram illustrating a UE and a base station device that can perform the disclosure. According to FIG. 17, a UE 1700 includes a transceiver 1710, a controller 1720, and a storage unit 1730. However, the constituent elements of the UE 1700 are not limited to the above-described examples, but, for example, the UE 1700 may include more constituent elements than the illustrated constituent elements, or may include fewer constituent elements. In addition, the transceiver 1710, the storage unit 1730, and the controller 1720 may be implemented in the form of one chip.

The transceiver 1710 may transmit and receive a signal to and from a base station 1740. Here, the signal may include control information and data. For this, the transceiver 1710 may be composed of an RF transmitter configured to perform up-conversion and amplification of the frequency of the transmitted signal, and an RF receiver configured to perform low-noise-amplification and down-conversion of the frequency of the received signal. However, this is merely an embodiment of the transceiver 1710, and the constituent elements of the transceiver 1710 are not limited to the RF transmitter and the RF receiver. Further, the transceiver 1710 may receive the signal through a radio channel, and may output the signal to the controller 1720, and may transmit the signal output from the controller 1720 through the radio channel. Further, the transceiver 1710 may be individually provided with an RF transceiver for a first wireless communication technology and an RF transceiver for a second wireless communication technology, or may perform physical layer processing as one transceiver in accordance with the first wireless communication technology and the second wireless communication technology.

The storage unit 1730 may store programs and data needed for the operation of the UE 1700. Further, the storage unit 1730 may store control information or data included in the signal being transmitted and received by the UE 1700. The storage unit 1730 may be composed of storage media, such as a ROM, RAM, hard disk, CD-ROM, and DVD, or combinations of the storage media. Further, a plurality of storage units 1730 may be provided.

The controller 1720 may control a series of processes so that the UE 1700 can operate according to the above-described embodiments of the disclosure. For example, the controller 1720 may transmit and receive data to and from the first base station in the second frequency band based on the resource allocation information received from the base station 1740 through the transceiver 1710. A plurality of controllers 1720 may be provided, and the controller 1720 may perform a control operation of the constituent elements of the UE 1700 by executing the programs stored in the storage unit 1730.

The base station 1740 includes a transceiver 1750, a controller 1760, and a storage unit 1780. However, the constituent elements of the base station 1740 are not limited to the above-described examples, but, for example, the base station 1740 may include more constituent elements than the illustrated constituent elements, or may include fewer constituent elements. In addition, the transceiver 1750, the storage unit 1780, and the controller 1760 may be implemented in the form of one chip.

The transceiver 1750 may transmit and receive a signal to and from the UE 1700. Here, the signal may include control information and data. For this, the transceiver 1750 may be composed of an RF transmitter configured to perform up-conversion and amplification of the frequency of the transmitted signal, and an RF receiver configured to perform low-noise-amplification and down-conversion of the frequency of the received signal. However, this is merely an embodiment of the transceiver 1750, and the constituent elements of the transceiver 1750 are not limited to the RF transmitter and the RF receiver. Further, the transceiver 1750 may receive the signal through a radio channel, and may output the signal to the controller 1760, and may transmit the signal output from the controller 1760 through the radio channel.

The controller 1760 may control a series of processes so that the base station 1740 can operate according to the above-described embodiments of the disclosure. For example, the controller 1760 may generate a message to be transmitted to another base station, and may transmit the message to another base station through a connection unit 1770. A plurality of controllers 1760 may be provided, and the controller 1760 may perform a control operation of the constituent elements of the base station 1740 by executing the programs stored in the storage unit 1780.

The storage unit 1780 may store programs and data needed for the operation of the base station. Further, the storage unit 1780 may store control information or data included in the signal being transmitted and received by the base station. The storage unit 1780 may be composed of storage media, such as a ROM, RAM, hard disk, CD-ROM, and DVD, or combinations of the storage media. Further, a plurality of storage units 1780 may be provided.

The connection unit 1770 is a device that connects the base station 1740, a core network, and another base station, and may perform physical layer processing for message transmission and reception, transmission of the message to another base station, and reception of the message from another base station.

On the other hand, embodiments of the disclosure that are described in the specification and drawings are merely for easy explanation of the technical contents of the disclosure and proposal of specific examples to help understanding of the disclosure, but are not intended to limit the scope of the disclosure. That is, it will be apparent to those of ordinary skill in the art to which the disclosure pertains that other modified examples that are based on the technical idea of the disclosure can be embodied. Further, as needed, the respective embodiments may be operated in combination. The embodiments of the disclosure have been described under the premise that the mobile network operators of the first base station and the second base station are different from each other, but they are not limited thereto.

The invention claimed is:

1. A method performed by a first base station for controlling collision of shared resources in a communication system, the method comprising:

receiving, from a second base station, a resource sharing message including information on the shared resources, wherein a priority of the second base station is higher than a priority of the first base station, for using the shared resources;

performing a communication with a first terminal using the shared resources;

receiving, from the second base station, a collision control message including information on a failure resource where data transmission between a second terminal and the second base station has failed, the information on the failure resource including a location of the failure resource in a time domain or a frequency domain;

identifying a collision rate based on a number of collision resources within a predetermined resource region, using the information on the failure resource; and performing scheduling for the first terminal to restrict usage of at least one resource among the shared resources, in case that the collision rate is higher than a predetermined collision rate, wherein the at least one resource is determined based on a size of the predetermined resource region, the number of collision resources, and the predetermined collision rate.

2. The method of claim 1, wherein the resource sharing message further comprises information on at least one of a collision type, a collision criterion, base station capability, or a base station location, and wherein the information on the shared resources includes a location of the shared resources in a time domain or a frequency domain, and a sharing type for the shared resources.

3. The method of claim 1, wherein the collision control message further includes information on a system variable needed to determine the collision of the shared resources or control usage of the shared resources, and wherein the system variable includes at least one of a resource sharing type on the shared resources, a frequency band of the shared resources, a shared time of the shared resources, a shared time interval, a shared resource transmission power table, a shared resource modulation and coding scheme (MCS) table, a collision definition delimiter, a collision reference value, a time interval for the predetermined resource region, a frequency for the predetermined resource region, base station capability, or a base station location.

4. The method of claim 1, wherein, if the predetermined resource region is a time duration, P, the at least one resource is N slots and determined based on:

$$k/a-P,$$

wherein, if the predetermined resource region is a bandwidth, Q, the at least one resource is N sub-carriers and determined based on:

$$k/a-Q, \text{ and}$$

wherein the k is the number of collision resources, and the a is the predetermined collision rate.

5. A method performed by a second base station for controlling collision of shared resources in a communication system, the method comprising:

transmitting, to a first base station a resource sharing message including information on the shared resources, wherein a priority of the second base station is higher than a priority of the first base station, for using the shared resources;

performing a communication with a second terminal using the shared resources:

identifying a failure resource where data transmission between the second terminal and the second base station has failed; and transmitting, to the first base station, a collision control message including information on a failure resource, the information on the failure resource including a location of the failure resource in a time domain or a frequency domain, wherein the information on the failure resource is used for identifying a collision rate that indicates a number of collision resources within a predetermined resource region, wherein scheduling for a first terminal to restrict usage of at least one resource among the shared resources is performed by the first base station, if the collision rate is higher than a predetermined collision rate, and wherein the at least one resource is determined based on a size of the predetermined resource region, the number of collision resources, and the predetermined collision rate.

6. The method of claim 5, wherein the resource sharing message further comprises information on at least one of a collision type, a collision criterion, base station capability, or a base station location, and wherein the information on the shared resources includes a location of the shared resources in a time domain or a frequency domain, and a sharing type for the shared resources.

7. The method of claim 5, wherein the collision control message further comprises information on a system variable needed to determine the collision of the shared resources or control usage of the shared resources, and wherein the system variable includes at least one of a resource sharing type on the shared resources, a frequency band of the shared resources, a shared time of the shared resources, a shared time interval, a shared resource transmission power table, a shared resource modulation and coding scheme (MCS) table, a collision definition delimiter, a collision reference value, a time interval for the predetermined resource region, a frequency for the predetermined resource region, base station capability, or a base station location.

8. A first base station in a communication system, the first base station comprising:

a transceiver configured to transmit and receive a signal to and from a first terminal;

and at least one processor configured to:

receive, from a second base station, a resource sharing message including information on the shared resources, wherein a priority of the second base station is higher than a priority of the first base station, for using the shared resources, perform a communication with the first terminal using the shared resources, receive, from the second base station, a collision control message including information on a failure resource where data transmission between a second terminal and the second base station has failed, the information on the failure resource including a location of the failure resource in a time domain or a frequency domain, identify a collision rate based on a number of collision resources within a predetermined resource region, using the information on the failure resource, and perform scheduling for the first terminal to restrict usage of at least one resource among the shared resources, in case that the collision rate is higher than a predetermined collision rate, wherein the at least one resource is determined based on a size of the predetermined resource region, the number of collision resources, and the predetermined collision rate.

9. The first base station of claim 8, wherein the resource sharing message further comprises information on at least one of a collision type, a collision criterion, base station capability, or a base station location, and wherein the information on the shared resources includes a location of the shared resources in a time domain or a frequency domain, and a sharing type for the shared resources.

10. The first base station of claim 8, wherein the collision control message further includes information on a system variable needed to determine the collision of the shared resources or control usage of the shared resources, and wherein the system variable includes at least one of a resource sharing type on the shared resources, a frequency band of the shared resources, a shared time of the shared resources, a shared time interval, a shared resource transmission power table, a shared resource modulation and coding scheme (MCS) table, a collision definition delimiter, a collision reference value, a time interval for the predetermined resource region, a frequency for the predetermined resource region, base station capability, or a base station location.

11. The first base station of claim 8, wherein, if the predetermined resource region is a time duration, P, the at least one resource is N slots and determined based on:

$$k/a - P,$$

wherein, if the predetermined resource region is a bandwidth, Q, the at least one resource is N sub-carriers and determined based on:

$$k/a - Q, \text{ and}$$

wherein the k is the number of collision resources, and the a is the predetermined collision rate.

12. A second base station in a communication system, the second base station comprising:

a transceiver configured to transmit and receive a signal to and from a second terminal;

and at least one processor configured to:

transmit, to a first base station, a resource sharing message including information on the shared resources, wherein a priority of the second base station is higher than a priority of the first base station, for using the shared resources, perform a communication with a second terminal using the shared resources, identify a failure resource where data transmission between the second terminal and the second base station has failed, and transmit, to the first base station, a collision control message including information on a failure resource, the information on the failure resource including a location of the failure resource in a time domain or a frequency domain, wherein the information on the failure resource is used for identifying a collision rate that indicates a number of collision resources within a predetermined resource region, wherein scheduling for a first terminal to restrict usage of at least one resource among the shared resources is performed by the first base station, if the collision rate is higher than a predetermined collision rate, and wherein the at least one resource is determined based on a size of the predetermined resource region, the number of collision resources, and the predetermined collision rate.

13. The second base station of claim 12, wherein the resource sharing message further comprises information on at least one of a collision type, a collision criterion, base station capability, or a base station location, wherein the information on the shared resources includes a location of the shared resources in a time domain or a frequency domain, and a sharing type for the shared resources, and wherein the first base station and the second base station correspond to different mobile network operators, respectively.

14. The second base station of claim 12, wherein the collision control message further comprises information on a system variable needed to determine the collision of the shared resources or control usage of the shared resources, and wherein the system variable includes at least one of a resource sharing type on the shared resources, a frequency band of the shared resources, a shared time of the shared resources, a shared time interval, a shared resource transmission power table, a shared resource modulation and coding scheme (MCS) table, a collision definition delimiter, a collision reference value, a time interval for the predetermined resource region, a frequency for the predetermined resource region, base station capability, or a base station location.

* * * * *